United States Patent [19]
Fujiwara et al.

[11] Patent Number: 5,831,965
[45] Date of Patent: Nov. 3, 1998

[54] CARTRIDGE CHANGING DEVICE

[75] Inventors: Tatsunori Fujiwara; Takashi Matsuda; Yasuyuki Nakanishi; Koutarou Oka; Kei Shirahata; Shigehiro Itoh, all of Hyogo, Japan

[73] Assignee: Mitsubishi Denki Kabushiki Kaisha, Tokyo, Japan

[21] Appl. No.: 733,169

[22] Filed: Oct. 17, 1996

Related U.S. Application Data

[62] Division of Ser. No. 537,311, Sep. 29, 1995.

[30] Foreign Application Priority Data

Oct. 19, 1994 [JP] Japan ................................ 6-253616
Jun. 30, 1995 [JP] Japan ................................ 7-166090

[51] Int. Cl.$^6$ .................................................. G11B 17/04
[52] U.S. Cl. ................................................................ 369/178
[58] Field of Search ........................ 369/178, 191, 369/192, 75.1, 77.1; 360/99.02, 99.06

[56] References Cited

U.S. PATENT DOCUMENTS

| | | | |
|---|---|---|---|
| 4,974,102 | 11/1990 | Hamachi et al. | 360/92 |
| 5,067,121 | 11/1991 | Einhaus | 369/75.2 |
| 5,587,989 | 12/1996 | Fujiwara et al. | 369/191 |
| 5,663,850 | 9/1997 | Nakanishi et al. | 360/98.06 |

FOREIGN PATENT DOCUMENTS

| | | |
|---|---|---|
| 0612070 | 8/1994 | European Pat. Off. . |
| 4440429 | 11/1993 | Germany . |
| 64-89066 | 4/1989 | Japan . |
| 3-222141 | 10/1991 | Japan . |

OTHER PUBLICATIONS

G.E. Lightner et al.; "Diskette–Eject Device for a Flexible File"; *IBM Technical Disclosure Bulletin*; vol. 26, No. 34, Aug. 1983; pp. 1240–1242.

*Primary Examiner*—Allen T. Cao

[57] ABSTRACT

A cartridge changing device includes a mechanism for restricting the rotation of a loading hook engaged with an inserted cartridge when discharging the cartridge from a holder so that the cartridge does not slide out of the holder and fall out of the device. The holder is movable from a standby position where a cartridge is inserted to a play position where the cartridge can be played. A rotatably disclosed loading hook is engagable with the cartridge inserted into the holder to hold the cartridge. A cartridge transfer mechanism stops the cartridge at a stop position after ejection where the cartridge is ejected out of the holder by restricting a reverse rotation of the loading hook in a direction of releasing the cartridge after ejection by pushing an eject lever. The eject lever can include a stopper and the loading hook can include a projection which comes into contact with the stopper of the eject lever after the eject lever has been pushed so as to restrict the rotation of the loading hook and then stop the cartridge at the stop position after ejection. Therefore, when a cartridge is ejected from a holder, the cartridge is transferred to the same position at all times due to the non-engagement of the loading hook with the cartridge during ejection.

8 Claims, 22 Drawing Sheets

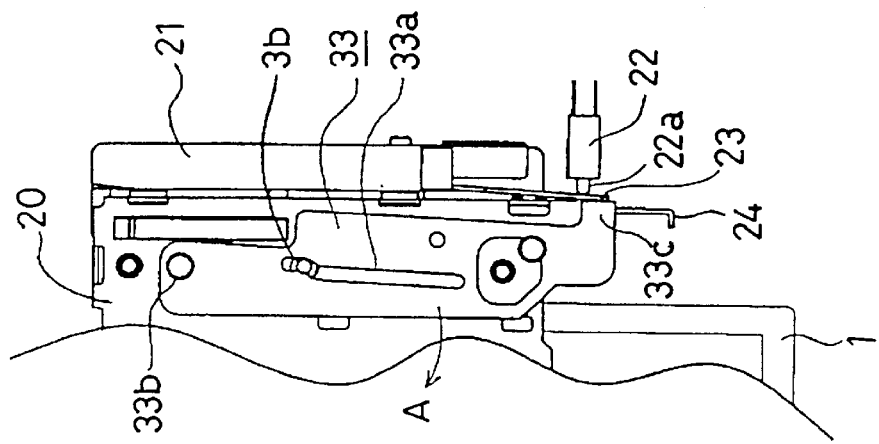
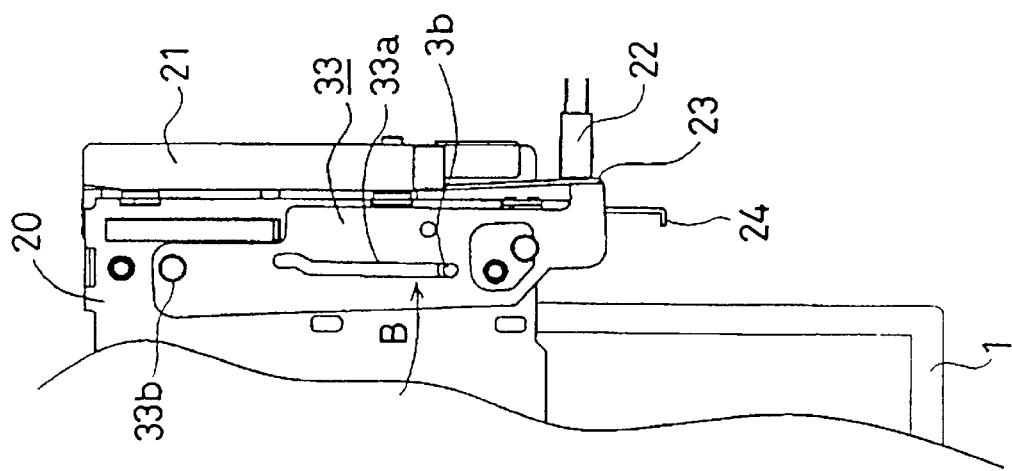

CARTRIDGE CHANGING DEVICE

This application is a divisional of copending application Ser. No. 08/537,311 pending, filed on Sep. 29, 1995, the entire contents of which are hereby incorporated by reference.

BACKGROUND OF THE INVENTION

1. Field of the Invention

The present invention relates to a cartridge changing device for use in a multiple play apparatus, in which a number of cartridges hold up disks respectively, for continuously playing multiple disks.

2. Description of the Prior Art

Referring now to FIG. 25, it illustrates a perspective view showing the basic structure of a prior art cartridge changing device for use in a multiple play apparatus. In the figure, reference numeral 1 denotes a cartridge such as a minidisk or the like, 45 denotes a front panel having a plurality of insertion openings 46 through which cartridges 1 are inserted into holders, respectively, and 14 denotes a pair of holder catchers disposed behind each of the plural insertion openings 46, a holder 2 for holding one inserted cartridge 1 being supported between a pair of holder catchers 14. Furthermore, reference numeral 47 denotes a holder locking mechanism disposed in each holder catcher 14, 48 denotes an eject button for dismounting a corresponding cartridge 1, and 49 denotes a position of a holder after a cartridge 1 is inserted into the holder. The position is referred to as an insert position hereinafter, and it is also equivalent to a standby position 50 of the cartridge 1. That is, the cartridge 1, which has been inserted from outside of the device, is supported in a corresponding pair of holder catchers 14 while it is held in a holder 2 and waits at the standby position 50 until the play device starts to play it.

Reference numeral 51 denotes a deck, where a recording device is disposed if necessary in addition to a playing device for reproducing a signal recorded on the cartridge 1, including holder securing members 52 for securing the holder 2 into which the cartridge 1 is inserted, a turn table 53 fixed to a motor shaft for rotating a disk (not shown in the figure) accommodated in the cartridge 1, and a sensor 54. Dampers 55 keeps the deck 51 in a floating state in order to prevent vibrations come from outside from reaching the deck. Hereinafter, a play position 56 of the cartridge 1 will be referred to as the position of the holder 2 placed on the deck 51, as shown in FIG. 26.

The dampers 55 are secured to the deck 51 and an elevator 57, a part of which is shown in FIGS. 25 and 26. The elevator 57 is moved up and down to the vertical position of the holder 2 into which the cartridge 1 to be played is inserted.

A holder moving unit 58 for translating a holder is disposed integrally in the elevator 57. The holder moving unit is shown separately on their both sides in FIGS. 25 and 26 for purposes of illustration. The holder moving unit 58 for translating a holder is adapted to move the holder 2 from the standby position 50 to the play position 56, and vice versa. A motor not shown in the figures drives the carrier 59 so as to translate the holder 2. During the translation, the carrier keeps holding the pins 2a of the holder 2. Furthermore, up-and-down movements of the elevator 57 causes up-and-down movements of the deck 51 and holder moving unit 58, thereby the levels of the deck 51 and holder moving unit 58 can be coincident with that of the holder 2 to be translated. Thus, the cartridge changing device for use in the multiple playing apparatus needs to move the cartridge smoothly to the play position during the interval from the insertion of the cartridge to the play of it without injury to the cartridge.

Next, the description will be directed to the detailed structure of the prior art with reference to figures showing a cartridge changing operation.

Referring now to FIG. 27, it illustrates a plan view showing a cartridge which is inserted into a holder. In the figure, reference numeral 6 denotes a switching plate which pivots in accordance with the insertion and ejection of the cartridge 1, such as a minidisk or the like, accommodated in the holder 2 for mounting, holding and ejecting the cartridge, and abuts on an insertion detecting switch 15.

As shown in FIG. 28, a plurality of pins 2a are secured on both sides of the holder 2 for guiding the holder 2. The right side view of the holder 2 with the cartridge 1 shown in FIG. 28 is shown in FIG. 29.

FIG. 30 shows the bottom plan view of the holder 2 depicted in FIG. 28 to help explain the insertion of the cartridge 1. In FIG. 30, reference numeral 3 denotes an eject plate which is moved together with the cartridge 1 when inserting or discharging the cartridge into or out of the holder, 4 denotes an eject spring which urges the eject plate 3 in the direction of discharging the cartridge, 5 denotes a loading hook pivotably supported by the eject plate 3 and urged in the direction of pressing the cartridge 2 to hold it by the eject spring 4, 9 denotes a second spring slidably disposed in the holder 2, 10 denotes an eject lever urged in the direction of discharging the cartridge 1 by the second spring 9, 11 denotes a locking plate which pivots according to a movement of the eject lever 10 for locking the eject plate 3 in the position where the cartridge 1 is held, and 12 denotes a first flat spring for temporarily securing the cartridge 1, which is inserted into the holder 2, to the holder 2. The first flat spring 12 in the form of a plate as shown in the left side view of FIG. 32 is secured on the holder 2.

Furthermore, reference numeral 13 in FIG. 30 denotes a second flat spring which closes a shutter (not shown in the figure) disposed in a window through which information can be read out of the cartridge 1, when ejecting the cartridge 1. The second flat spring 13 in the form of a plate as shown in the right side view of FIG. 33 is secured to the holder 2.

Now, the description will be directed to the front structure of the cartridge changing device with reference to the plan view of FIG. 27 and front view of FIG. 31. In FIGS. 27 and 31, reference numeral 7 denotes an open/close door pivotably supported in the holder 2 for opening and closing the insertion opening of the holder 2, and 8 denotes a first spring which urges the open/close door in the direction of closing it. When the cartridge 1 is inserted into the holder through the insertion opening, the front end of the cartridge 1 comes into contact with the open/close door 7. Then, the open/close door 7 pivots about the axis in an upward direction. The both ends of the axis are designated by reference numerals 7a and 7b.

Next, the inserting operation of the cartridge will be explained. When a user inserts the cartridge 1 to be played into a holder by way of one of the plural insertion openings 46, as shown in FIG. 25, the cartridge 1 comes into contact with the open/close door 7, thereby opening it in an upward direction against the force of the spring which urges the open/close door 7. Then, the cartridge 1 is inserted into the holder as far as it will go.

During the insertion, the open/close door 7 in such the prior art device is bent because it is, typically, made of a thin material. FIG. 34 is a plan view showing the bending in the open/close door 7. A drawback to the conventional open/closed door 7 is that the cartridge 1 cannot be moved smoothly since the ends 7a and 7b of the axis of the door fall off the holes for supporting the ends due to the bending.

As shown in FIG. 35, if another cartridge 1 is inserted into an opening 46 of a holder which is located in the upstairs of a holder 2 free of a cartridge, when the cartridge inserted already in the upstairs holder is being played, the another cartridge 1 abuts on and pushes the open/close door 7 of the downstairs holder 2. As a result, the axis of the open/close door 7 falls off the holes or the door is broken, and therefore the cartridge 1 cannot be moved smoothly. In FIG. 35, when the cartridge 1 is inserted in a slanting direction, the front lower edge of the cartridge 1 pushes the open/close door in the lower section. The center of the open/close door 7 is bent toward inside the device. If the amount of the bending becomes large, the ends of the axis of the open/close door 7 are off the holes and then the axis falls off. FIG. 36 shows an enlarged detail of FIG. 35 to explain the state more clearly. A glance at FIG. 36 indicates that the inserted cartridge 1 comes into contact with the lower open/close door 7.

Next, the description will be directed to the operation of the prior art device after the cartridge 1 is inserted into the holder 2 through the open/close door 7. For simplicity, the operation will be explained with reference to FIG. 24. As shown in FIG. 24, the upper left corner 1b of the cartridge 1 comes into contact with loading hook 41 first. When the cartridge is further inserted into the holder, the loading hook 41 pivots in the direction opposite to the direction of holding the cartridge against the elastic force of the spring. Then, a recess of the cartridge 1 is engaged with the loading hook 41 and the cartridge 1 abuts on the eject plate 3. This state is shown in FIG. 24. When the cartridge is further inserted into the device, the switching plate 6 shown in FIG. 27 is rotated to turn off the switch 15, the eject plate 3 having an elastic energy charged due to the force of the spring 4 is secured by the locking plate 11, and then the circumference of the cartridge 1 is held by the flat spring 12, as shown in FIG. 18. This results in ensuring that the device retracts the holder 2 to play the cartridge.

Next, the eject operation which is the reverse of the insert operation will be explained briefly with reference to FIG. 30. When the eject lever 10 is pressed, the locking plate 11 is rotated and hence the lock of the eject plate 3 is released. As a result, the elastic force charged in the spring 4 pulls the eject plate 3 together with the cartridge 1. The shutter of the cartridge 1 is closed when the cartridge is ejected from the holder because it is merely pushed by the second flat spring 13. In this manner, the insert and eject operations of the cartridge are performed.

As previously mentioned, such the cartridge changing device needs to carry a cartridge smoothly during the insertion or ejection of the cartridge. However, the prior art device mentioned above suffers from a drawback that the cartridge is out of the correct hold position in the holder for some reason when the device starts to retract the holder after the cartridge has been accommodated correctly in the holder and hence the cartridge is not mounted in the play position. This causes a malfunction in the play device.

Furthermore, when a cartridge is inserted into a holder free of a cartridge through the insertion opening of another holder, in which another cartridge is being played, lies just above the former holder in a downward and slanting direction, the inserted cartridge comes into contact with and then pushes the open/close door of the former holder. As a result, the axis of the door falls off or the door is broken, as mentioned above. This causes a malfunction in the device. Therefore, the cartridge changing device needs to prevent a cartridge passing through an insertion opening of a section from being inserted into another holder lies just below the upper holder in a slanting direction and being awkward in its movements.

Another problem is that the loading hook cannot keep holding the cartridge due to the impact of the cartridge when it stops in the stop position after ejection and hence the cartridge is ejected to a further forward position than it should be ejected to a predetermined position, because the cartridge accommodated in the holder is moved from the standby position to the stop position after ejection by means of the elastic force of the spring which is released by pushing the eject lever of the holder lies in the standby position. Therefore, cartridges are carried to uncertain positions when discharging the cartridges. Some cartridges are out of holders and then fall off the holders. Furthermore, the increase of the elastic force applied to the circumference of the cartridge to solve this problem causes a big resistance in the holder to insert and eject the cartridge into and out of the holder. This results in providing users with a bad feeling in the inserting operation.

As mentioned above, the cartridge changing device is adapted to handle a plurality of cartridges, arranged in a vertical direction, each extending in a horizontal plane. Furthermore, since each holder has holes circle-shaped in cross section, into which the both ends of the axis of the open/close door are respectively inserted, the thickness of the upper side of the holder above each end of the axis must be bigger than that of the metallic plate which constructs the holder. It was therefore difficult to make the device provided with such plural holders thinner.

SUMMARY OF THE INVENTION

It is therefore an object of the present invention to provide a cartridge changing device in which a cartridge can be inserted into and ejected out of a holder under a condition of stability.

It is another object of the present invention to provide a cartridge changing device capable of detecting whether or not a cartridge is correctly held in a holder, thereby preventing damage to a play unit.

It is a further object of the present invention to provide a cartridge changing device, which can be easily thinned, in which an open/close door of a holder is not bent and hence does not fall off the holder even when a cartridge is inserted into the opening of the holder located in the upstairs of the holder to which the cartridge should be inserted.

In accordance with the present invention, there is provided a cartridge changing device comprising a plurality of holders each for holding a cartridge inserted thereinto, a holder catcher for supporting the holders in a state that each of the holders can be loaded into a play device and a cartridge inserted into each of the holders can be ejected out of each of the holders, a plurality of insertion detecting switches each for detecting an insertion of a cartridge into each of the holders, an elastic plate for pushing each of the insertion detecting switches so as to change its state when an external force is applied thereto, and a switching plate disposed in each of the holders and able to move according to an insertion of a cartridge into each of the holders to apply the external force to the elastic plate.

In operation, if a cartridge is detached from one holder during a movement of the holder and then a corresponding insertion detecting switch switches on, the cartridge changing device determines that defective conditions are encountered. Therefore, the device can put the holder back into position, thereby preventing damage to the device and cartridge.

Preferably, the elastic plate is secured to the holder catcher. Furthermore, the plate includes a plurality of end parts each able to push each of the insertion detecting switches, the number of the end parts being equal to that of the plural holders. Each end part of the elastic plate is bent into a first state so as to switch on a corresponding insertion detection switch when a cartridge is ejected from a corresponding holder, each end part of the elastic plate is bent back into a second state when a cartridge is inserted into a corresponding holder, and each end part of the elastic plate keeps the second state while a corresponding holder with a cartridge is moving.

The device further comprises a first flat spring disposed in each of the holders for holding a cartridge in each of the holders, a second flat spring disposed in each of the holders for closing a shutter of a cartridge when the cartridge is ejected from each of the holders, an open/close door disposed in each of the holders for opening and closing an insertion opening of each of the holders, and a spring disposed in each of the holders for urging one corresponding open/close door in a direction of closing the door, walls of holes for supporting an axis of each open/close door being partially constructed by parts of the first and second flat springs. Preferably, the holes disposed for each open/close door are U-shaped in cross section and the upper side walls of the U-shaped holes are constructed by parts of the first and second flat springs. Since the thickness of the upper side walls of the U-shaped holes constructed by the parts of the first flat spring for holding a cartridge in each holder and second flat spring for closing the shutter of the cartridge can be equal to that of the upper side walls of the holes for supporting the axis of an open/close door, the thickness of the plural holders can be reduced.

Furthermore, each open/close door includes holes formed on its own axis in the vicinity of the center of the door, and each holder includes projections which are engaged with the holes of each open/close door. When another cartridge is inserted into an opening of a holder, which is located in the upstairs of the holder free of a cartridge, in a downward and slanting direction, when the cartridge inserted already in the upstairs holder has been played, the projecting parts of the holder, which are inserted into the holes of the open/close door, receive (or stop) the front end of the inserted cartridge. Thus, the projecting parts prevent the open/close door from being bent when a cartridge is inserted into the holder in a downward and slanting direction.

In a preferred embodiment of the present invention, the cartridge changing device comprises a holder which is able to move from a standby position where a cartridge is inserted thereinto to a play position where the cartridge is to be played, a loading hook rotatably disposed and engageable with a cartridge inserted into the holder to hold the cartridge, and a cartridge transfer mechanism for stopping a cartridge at a stop position after ejection where the cartridge is ejected out of the holder by restricting a reverse rotation of the loading hook in a direction of releasing the cartridge during an eject lever of the holder is pushed after the cartridge in the holder located at the standby position has been transferred to the stop position after ejection by pushing the eject lever.

Preferably, the eject lever includes a stopper and the loading hook includes a projection which comes into contact with the stopper of the eject lever after the eject lever has been pushed so as to restrict the rotation of the loading hook and hence stop the cartridge at the stop position after ejection. When a cartridge is ejected from a holder, the cartridge is transferred to the same position at all times due to the restriction of the rotation of the loading hook in the direction of releasing the cartridge while the eject lever is held pushed.

Further objects and advantages of the present invention will be apparent from the following description of the preferred embodiments of the invention as illustrated in the accompanying drawings.

BRIEF DESCRIPTION OF THE DRAWINGS

FIG. 6 is a partial plan view of the holder illustrating the switching plate, elastic plate, and insertion detecting switch, in the embodiment of the present invention;

FIG. 7 is a partial plan view of the holder illustrating the switching plate, elastic plate, and insertion detecting switch, in the embodiment of the present invention;

DETAILED DESCRIPTION OF THE PREFERRED EMBODIMENTS

Next, the description will be directed to a cartridge changing device in which a plurality of cartridges are respectively inserted into and ejected from holders according to the first embodiment of the present invention with reference to FIGS. 1 to 7. This embodiment is concerned with the structure of the device.

Figure 1:
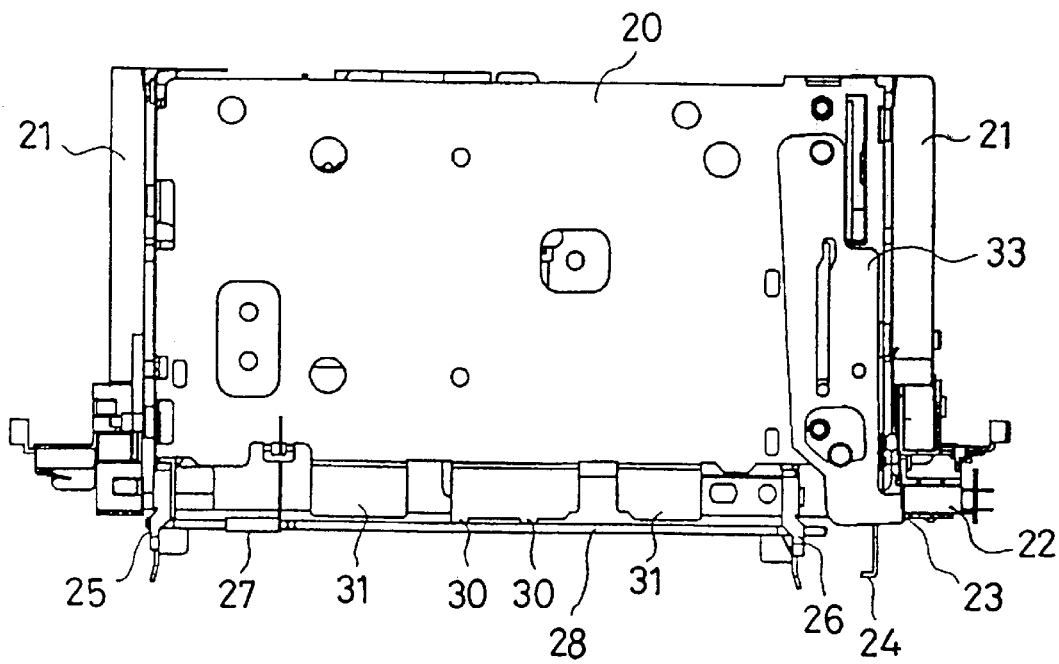
FIG. 1 is a partial plan view of a cartridge changing device according to an embodiment of the present invention.

FIG. 1 shows a plan view of the cartridge changing device illustrating a state of the device before a cartridge 1 is inserted into the device. In the figure, reference numeral 20 denotes a holder which accommodates and holds the cartridge 1 (not shown in the figure) therein, 21 denotes a pair of holder catchers for supporting the holder 20 in a state in which the holder can be loaded into the play device and for holding a cartridge 1 in a state in which the cartridge can be ejected out of the holder, 22 denotes an insertion detecting switch secured to the holder 20 for detecting the insertion of a cartridge 1 into the cartridge changing device, 23 denotes an elastic plate fixed to the holder catcher 21 for providing an elastic force to press the insertion detecting switch 22, 33 denotes a switching plate which switches off the insertion detecting switch 22 by means of the elastic plate 23 in response to the insertion of a cartridge 1 into the holder 20, 24 denotes an eject lever which pushes the cartridge 1 when discharging the cartridge 1 out of the holder 20, 25 denotes a first flat plate for holding the cartridge 1 within the holder 20, 26 denotes a second flat spring for closing the shutter of the cartridge 1 when ejecting the cartridge 1, 27 denotes a spring which urges an open/close door, 28 denotes the open/close door, which is urged by the spring in the direction of closing the door, for opening and closing an insertion opening of the holder 20, 30 denotes a receiving member disposed in a projection formed in the holder 20 for receiving the open/close door 28, and 31 denotes a projection.

Figure 2:
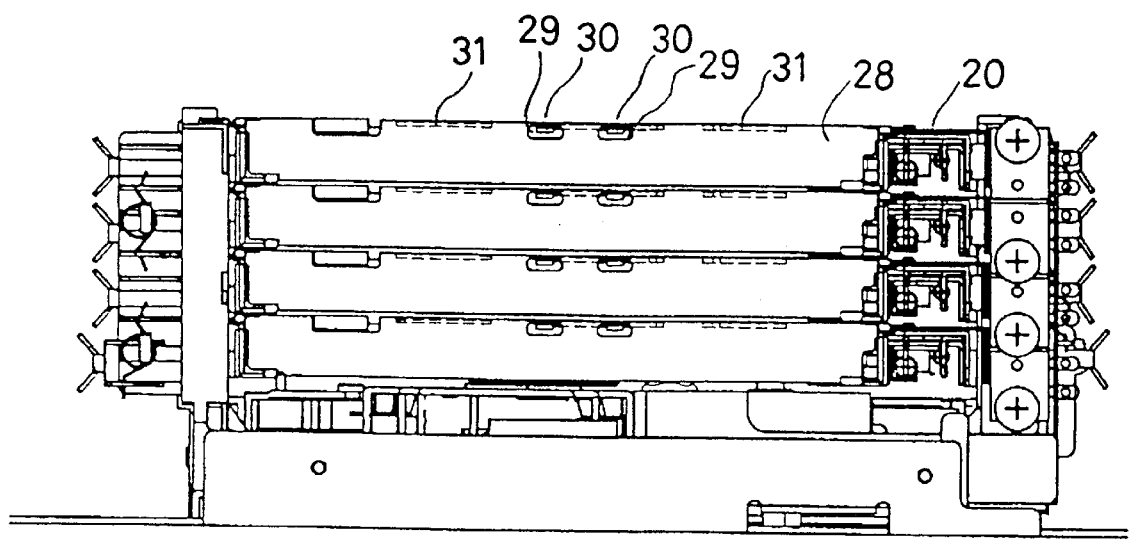
FIG. 2 is a front view of the cartridge changing device according to the embodiment of the present invention.

Referring now to FIG. 2, it illustrates a front view of the cartridge changing device of this embodiment. The open/close door 28 has two square holes 29. The ends of the receiving members 30 disposed in the holder 20 are inserted into the square holes 29, respectively. The projections 31 of the holder 20, which are shown dashed in FIG. 2, are located behind the open/close door 28. As shown in FIG. 2, the two projections 31 of the holder 20 are horizontally arranged in parallel with the axis of rotation of the open/close door and apart from each other. Furthermore, there is a narrow space between the ends of the projections 31 and the open/close door 28.

Figure 3:
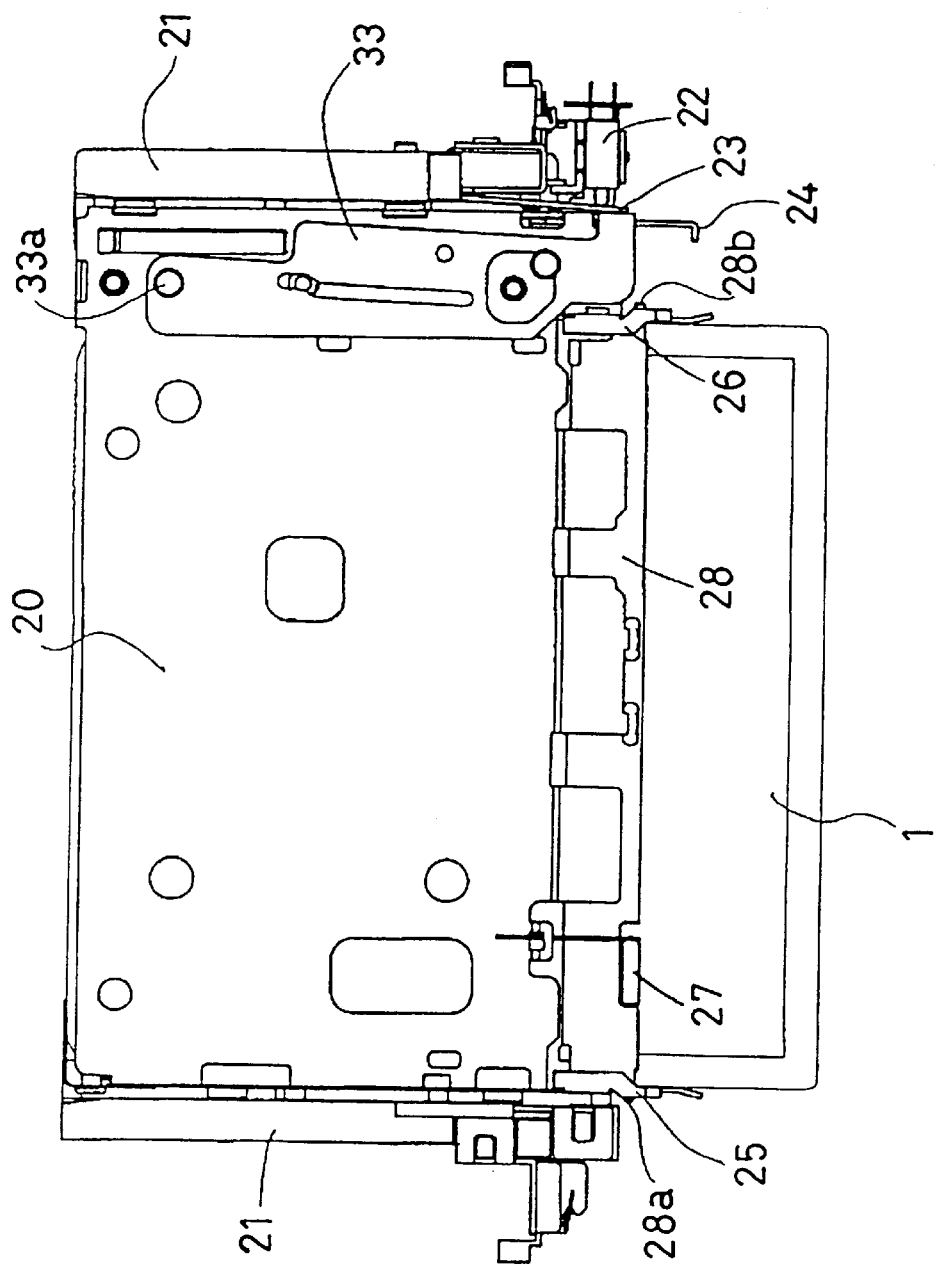
FIG. 3 is a plan view of the holder, into which a cartridge is inserted, in the embodiment of the present invention.

Referring now to FIG. 3, it illustrates a plan view showing a state in which the cartridge 1 is inserted into the holder 20. When the cartridge 1 is inserted into the holder, the front end of the cartridge 1 pushes the open/close door 28 against the elastic force of the spring 27 so as to rotate the door about the axis, the both ends of which are designated by reference numerals 28a and 28b, and keep it in a horizontal position. Simultaneously, the receiving members 30 of the holder 20 are further inserted into the square holes 29 disposed in the vicinity of the center of the open/close door 28.

Figure 4:
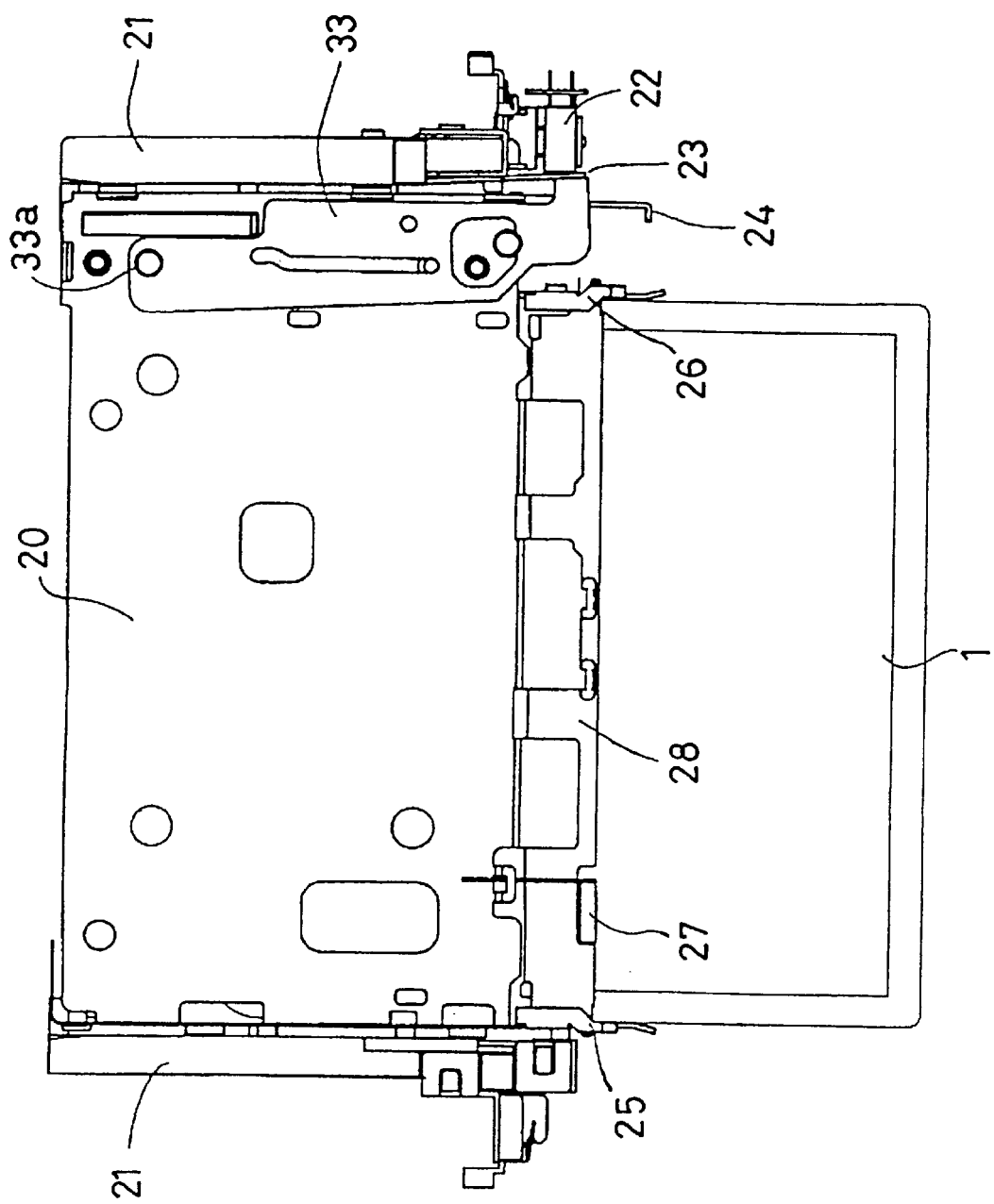
FIG. 4 is a plan view of the holder from which a cartridge is ejected, in the embodiment of the present invention.
Figure 5:
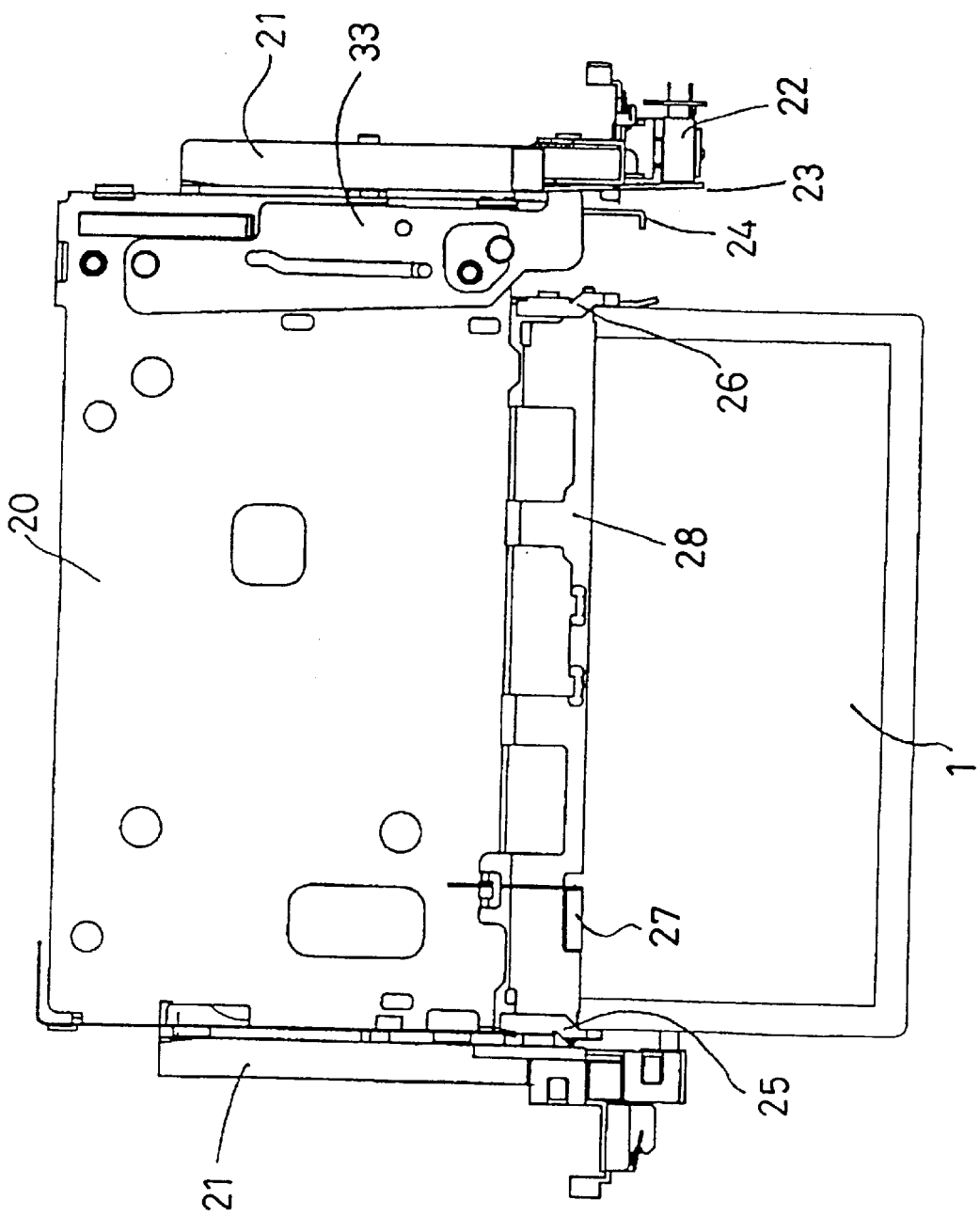
FIG. 5 is a plan view of the holder, which is being carried, in the embodiment of the present invention.

Referring now to FIG. 4, it illustrates a state in which the cartridge is ejected from the holder 20. FIG. 5 shows a state in which the holder 20 is being translated forward while the cartridge 1 is held in an incorrect position within the holder. Next, the description will be directed to the insertion detecting of the cartridge in these states with reference to FIGS. 6, 7, and 8.

FIG. 6 shows the operation of the elastic plate 23 when the cartridge 1 is inserted into the holder 20. In the figure, reference numeral 3b denotes a pin secured to the upper side on the eject plate 3 (not shown in FIG. 6). The pin 3b slides along the recess 33a of the switching plate 33 according to the insertion of the cartridge 1 and hence the switching plate 33 rotates about the axis 33b in the direction of the arrow A. Then, the contact between the switching plate 33 and the elastic plate 23 is released and then the contact between the elastic plate 23 and the insertion detecting switch 22 is also released. As a result, the end part 22a of the switch 22 comes out and hence the switch changes from the ON state to the OFF state to inform that the cartridge 1 is inserted into the holder. That is, it is detected that a cartridge is inserted into the holder in case the state of the insertion detecting switch 22 is changed to the OFF state.

Referring now to FIG. 7, it illustrates a plan view showing a state in which the cartridge 1 is ejected from the holder 20. As shown in FIG. 7, when the eject lever 24 is pushed, the pin 3b slides along the recess 33a and hence the switching plate 33 rotates about the axis 33b in the direction of the arrow B. Then, the elastic plate 23 comes into contact with the insertion detecting switch 22. As a result, the state of the switch 22 changes from the OFF state to the ON state. Thus, the cartridge 1 is released from the restraint imposed by the holder 2. That is, it is detected that a cartridge 1 is ejected out of the holder in case the state of the insertion detecting switch 22 is changed to the ON state.

Figure 8:
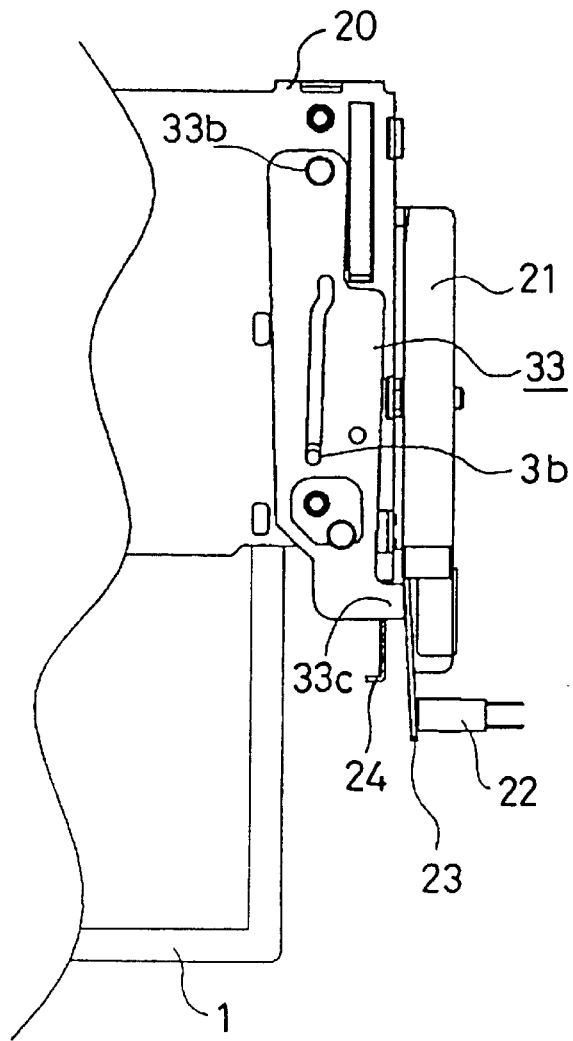
FIG. 8 is a partial plan view of the holder illustrating the switching plate, elastic plate, and insertion detecting switch, in the embodiment of the present invention.

Next, the description will be directed to an abnormal state of the device with reference to FIG. 8. FIG. 8 shows the case in which the cartridge 1 is moved together with the holder 20 toward the back of the cartridge changing device, i.e., toward the play position where the cartridge is to be played. In this case, the elastic plate 23 is urged toward the right side of the figure and therefore the insertion detecting switch 22 is switched on. In the normal state, the insertion detecting switch 22 is held switched off while the holder 20 which holds the cartridge 1 is moving so as to inform that the cartridge 1 is inserted into the holder 20, as shown in FIG. 6, whereas the end part 33c of the switching plate comes into contact with the elastic plate 23 during the movement of the holder 20 toward the play position and hence the insertion detecting switch 22 is switched on unless the cartridge is held in a correct position, as shown in FIG. 8. Thus, the device can judge whether or not a cartridge held in a holder is in an abnormal state. As a result, the cartridge changing device can control the holder 20 on the basis of the judgement so as to return the holder to the standby position where the cartridge has been inserted into the holder. The control operation is performed based on the detection of the ON state of the insertion detecting switch during the translation of the holder, not the judgement that the cartridge is in an abnormal condition due to the fact that a reproduced signal cannot be generated from the cartridge 1 during a replay operation after the holder, in which the cartridge is not held in a correct position, has been moved to the play position.

According to the first embodiment, the cartridge changing device makes it possible to determine whether or not the cartridge is held in a correct condition on the basis of whether the insertion detecting switch is on or off. Therefore, the cartridge changing device can control cartridges so that they move smoothly, and quickly detect wrong operations or the like.

Figure 9:
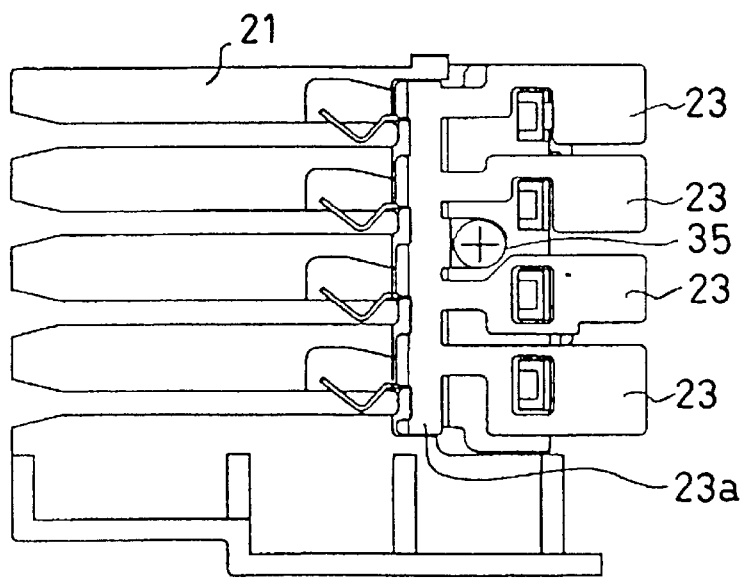
FIG. 9 is a left side view illustrating the elastic plate secured to a side surface of the holder catcher, in the embodiment of the present invention.
Figure 10:
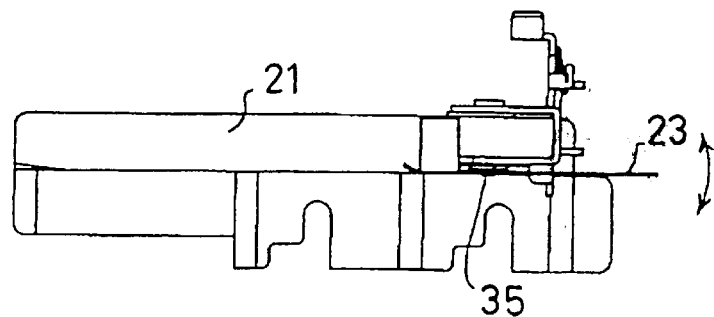
FIG. 10 is a partial plan view illustrating the elastic plate secured to the side surface of the holder catcher, in the embodiment of the present invention.

Referring now to FIG. 9, it illustrates a side view showing the shape of the elastic plate 23. The elastic plate 23 includes a plurality of branched end parts, the number of which are equal to that of the plural holders 20. Each of these end parts are adapted to abut on and then push one insertion detecting switch due to an external force applied thereto by each switching plate 33 so as to switch on the insertion detecting switch. The common part of the plural elastic plate 23 is secured to the holder catcher 21 by the screw 35. FIG. 10 is a top plan view showing the upper edge of the elastic plate 23. The elastic plate 23 is adapted to rotate in the direction of the arrow according to the movement of the switching plate 33.

Next, the description will be directed to an example of an open/close door which can provide a smoothly inserting operation of cartridges and a low-profile cartridge changing device.

Figure 11:
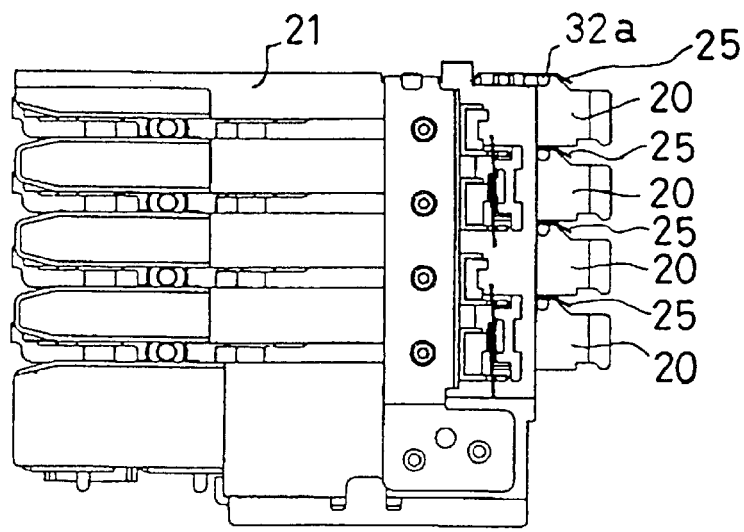
FIG. 11 is a left side view of the cartridge changing device according to the embodiment of the present invention.
Figure 12:
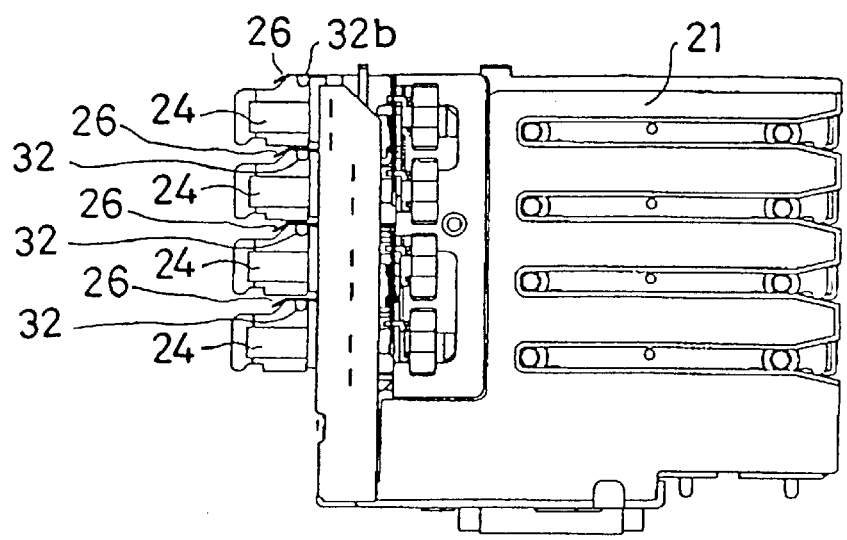
FIG. 12 is a right side view of the cartridge changing device according to the embodiment of the present invention.

Referring now to FIG. 11, it illustrates the left side view of the cartridge changing device of this embodiment. In the figure, reference numeral 20 denotes a holder, 21 denotes a holder catcher, 25 denotes a flat spring, and 32a denotes a hole into which one end 28a of the axis (not shown in the figure) of the open/close door 28 is inserted. FIG. 12 shows the right side view of the cartridge changing device. In the figure, reference numeral 24 denotes an eject lever, 26 denotes a flat spring, and 32b denotes a hole into which the other end 28b of the axis (not shown in the figure) of the open/close door 28 is inserted.

Figure 13:
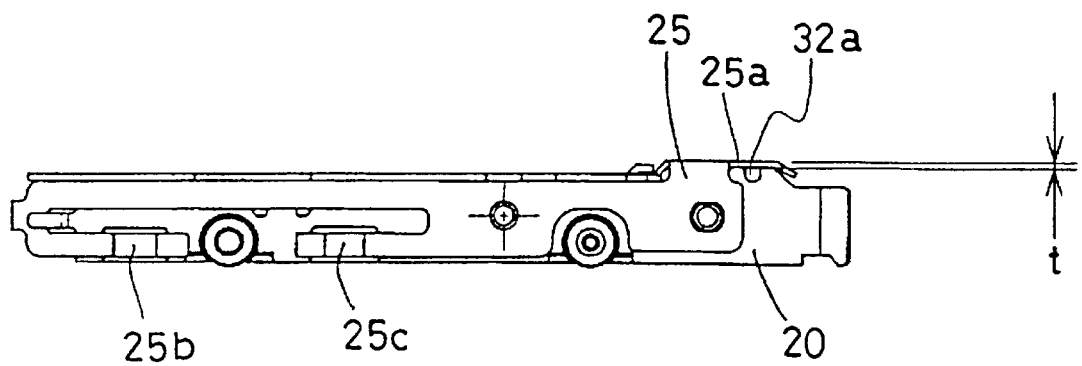
FIG. 13 is a left side view of one holder in the cartridge changing device according to the embodiment of the present invention.

Next, examples of the holes 32a and 32b for receiving the ends of the axis will be explained by referring to figures. FIG. 13 shows the left side view of a single holder 20. As shown in FIG. 13, the first flat spring 25 is secured to the left-side surface of the holder 20 and is adapted to push down the upper part of the left-side end 28a of the axis (not shown in the figure) of the open/close door 28. Reference numeral 25a denotes a bent portion which constructs a part of the wall of the hole 32a, and the thickness of the bent portion is designated by reference character t. The spring portions 25b and 25c of the flat spring 25 are engaged with a cartridge inserted into the holder so as to hold the cartridge.

Figure 14:
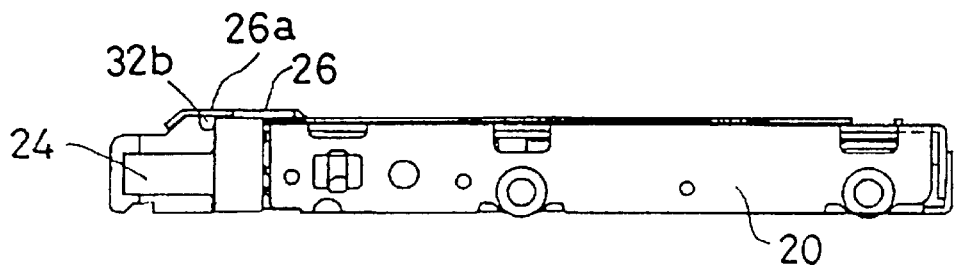
FIG. 14 is a right side view of one holder in the cartridge changing device according to the embodiment of the present invention.
Figure 15:
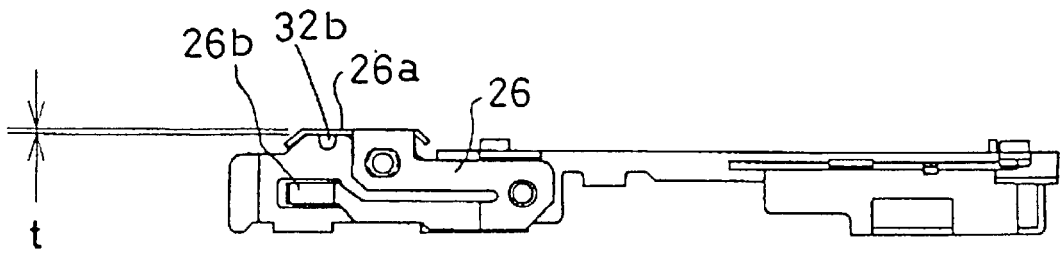
FIG. 15 is a right side view illustrating the flat spring of the holder of FIG. 14.

FIG. 14 shows the right side view of the single holder 20. As shown in FIG. 14, the second flat spring 26 is secured to the right-side surface of the holder 20 and is adapted to push down the upper part of the right-side end 28b of the axis (not shown in the figure) of the open/close door 28. FIG. 15 shows the right side view illustrating the second flat spring 26 more clearly by omitting the holder 20 for purposes of illustration. The second flat spring 26 includes a spring portion 26b for opening and closing the shutter of the inserted cartridge and a bent portion 26a which constructs a part of the wall of the hole 32b. The thickness of the bent portion is designated by reference character t in the figure.

Since parts of the first and second flat springs 25 and 26 construct parts of the walls of the holes 32a and 32b for supporting the ends of the axis formed as a part of the open/close door 28 made of a thin material, the thickness of the upper side wall of each of the transverse holes 32a and 32b can be decreased to a considerable degree. In this embodiment, the holes 32a and 32b are U-shaped in cross section as shown in FIGS. 13 and 14. To obtain the holes shaped like a circle, the upper surface of the holder 20 in the vicinity of the openings of the U-shaped holes 32a and 32b, which are blocked by the flat springs, requires a greater wall thickness than the thickness t of the first and second flat springs 25 and 26. That's because the upper surface of the holder 20 in the vicinity of the openings are torn off and the circle-shaped holes cannot be obtained if the wall thickness is not enough for stamping. Since the openings of the holes 32a and 32b are covered by the first and second flat springs 25 and 26, the whole size of the holes including the thickness of the side walls can be decreased and the thickness of the device can be reduced. Furthermore, cartridges can be smoothly and easily inserted into holders because the open/closed doors of the holders can be thinned.

According to this embodiment of the present invention, when a cartridge 1 is inserted into a holder 20 through the insertion opening of the holder, the open/close door is not bent and is not off the holes supporting the axis thereof even if the cartridge is inserted into the holder in a downward and slanting direction from the insertion opening. As shown in FIGS. 1 and 2, the receiving members 30 disposed on the holder 20, which are inserted into the square holes 29 of the open/close door 28, does not interfere with the rotation of the open/close door 28. The projections 31 disposed on the holder 20 are adapted to prevent the open/close door 28 from being bent toward in an upward direction above the ends 28a and 28b of the axis. There is a narrow space between the open/close door 28 and the projections 31 located beside the other projection provided with the receiving members 30, as shown in FIG. 1.

As shown in FIGS. 11 and 12, the holes 32a and 32b for supporting the ends of the axis of the open/close door 28 are respectively formed in the both side walls of the holder 20. The holes 32a and 32b have openings which are covered by the flat springs 25 and 26, respectively. That is, parts of the side walls of the holes 32a and 32b are constructed by the flat springs 25 and 26, respectively.

Figure 34:
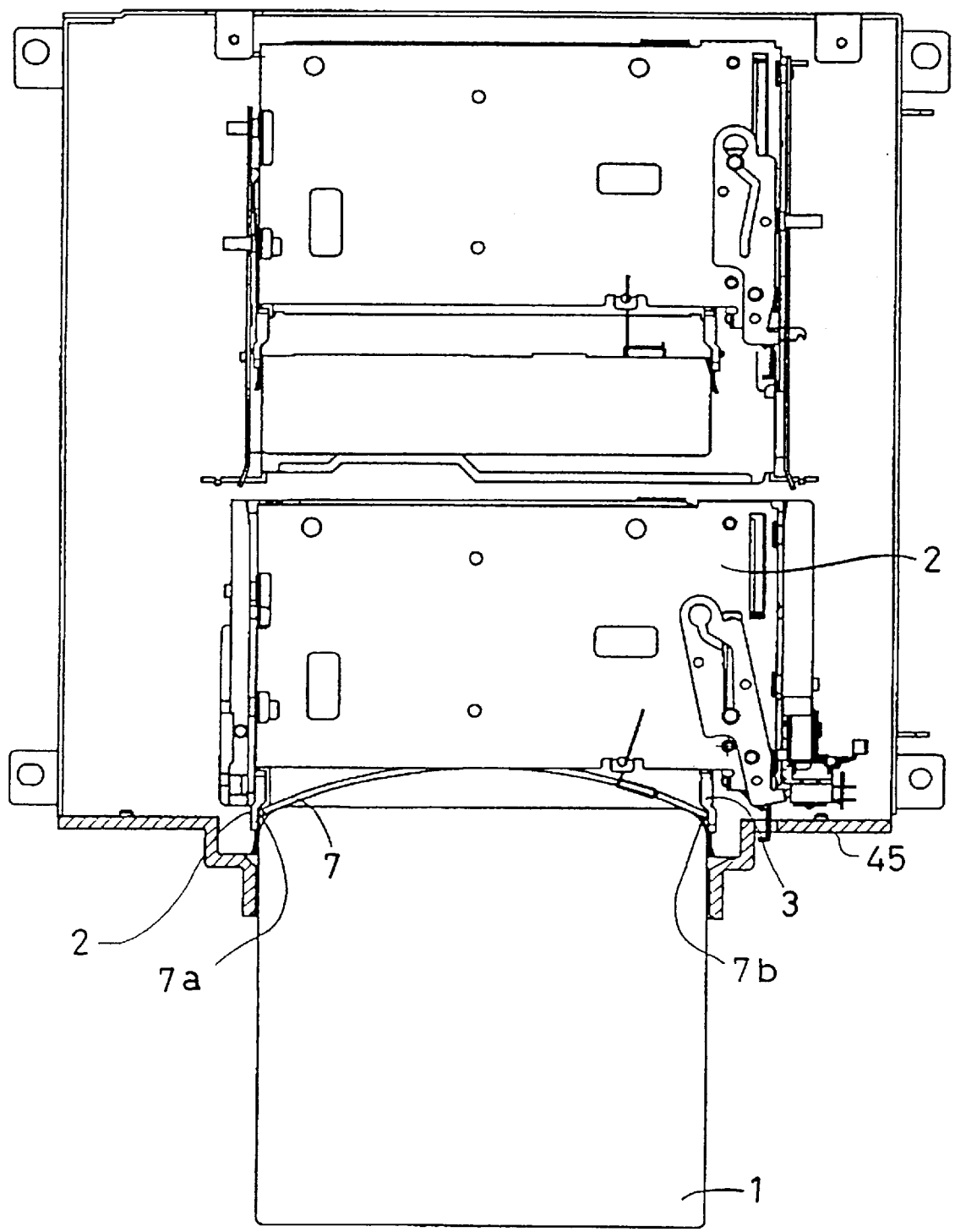
FIG. 34 is a plan view of the prior art cartridge changing device.
Figure 35:
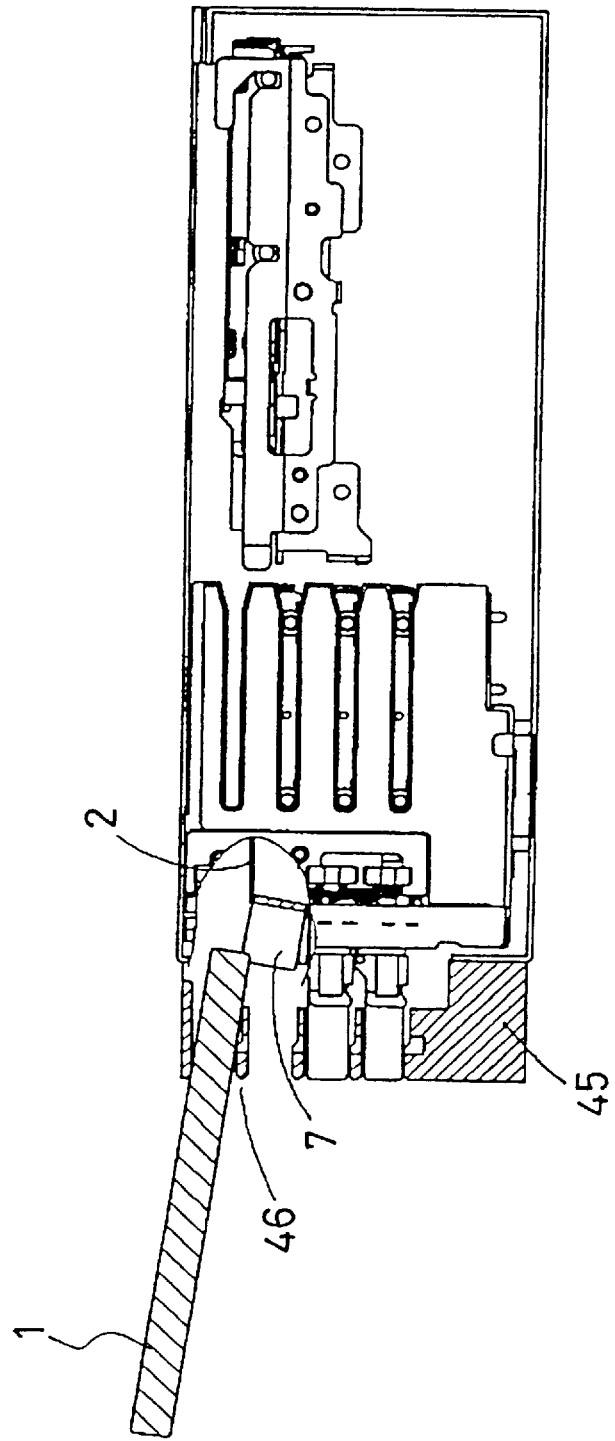
FIG. 35 is a side view, partially in section, of the prior art cartridge changing device.
Figure 36:
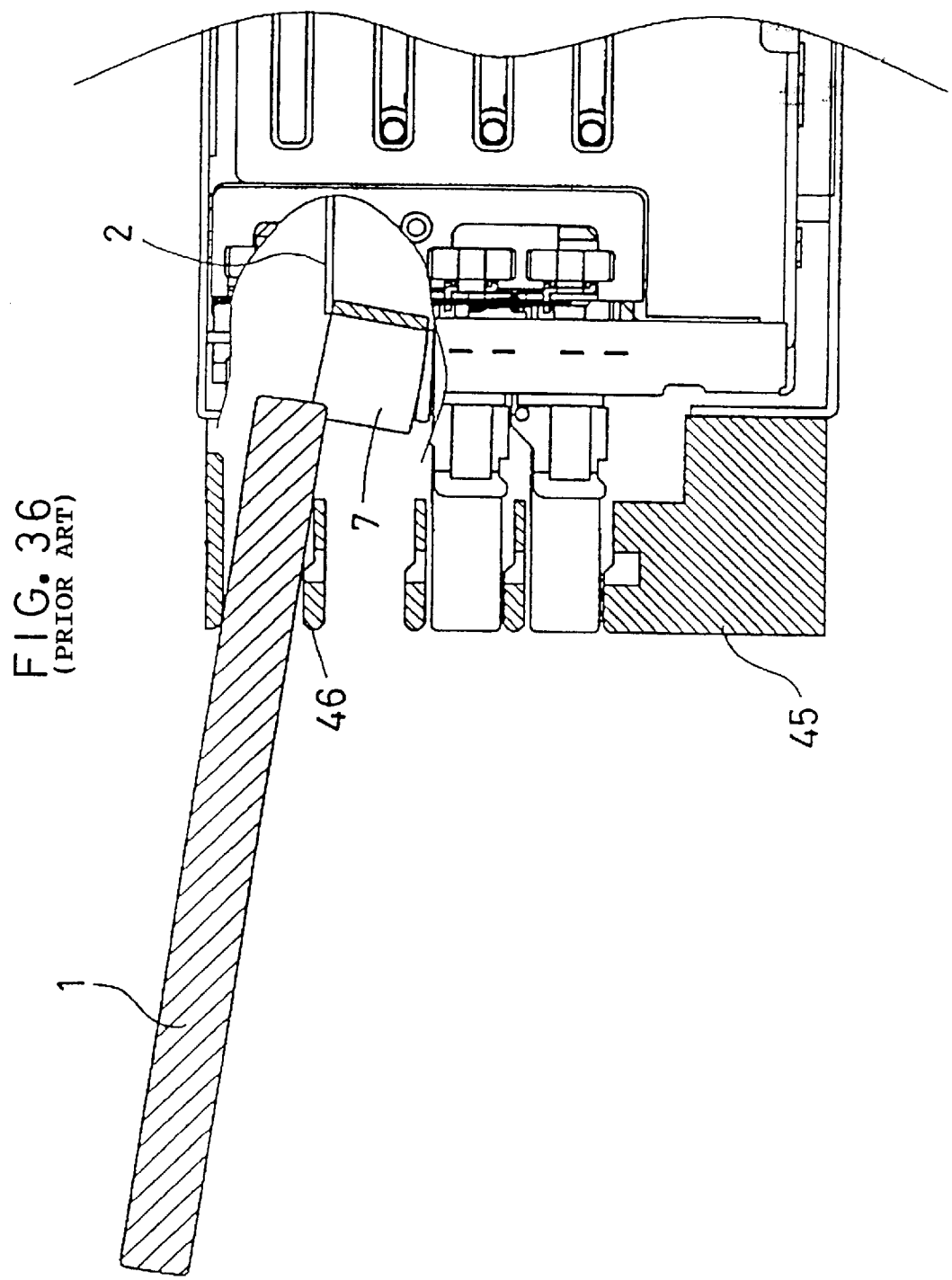
FIG. 36 is an enlarged side view of a portion of the prior art cartridge changing device.

Next, the description will be directed to the operation of the open/close door 28 having the structure mentioned above according to this embodiment of the present invention. First, the operation of the prior art open/close door will be explained with reference to FIGS. 34, 35, and 36. Since the conventional open/close door is, typically, made of a thin material, when a cartridge 1 is incorrectly inserted into another holder in a downward and slanting direction by way of the insertion opening 46 of the another holder, when the cartridge in the another holder has already been played as shown in FIG. 35, the cartridge 1 comes into contact with the open/close door 7 of the holder, the open/close door 7 is bent in a forward and downward direction and hence the ends 7a and 7b of its axis fall off the holes for supporting the ends of the axis. As can be seen more clearly from FIG. 36 showing an enlarged view which corresponds to FIG. 35, the cartridge 1 comes into contact with the open/close door 7 of the downstairs holder if the cartridge is inserted into the holder in a downward and slanting direction through the insertion opening of the holder. Therefore, a disadvantage is that the cartridge 1 cannot be smoothly inserted into the holder.

Figure 16:
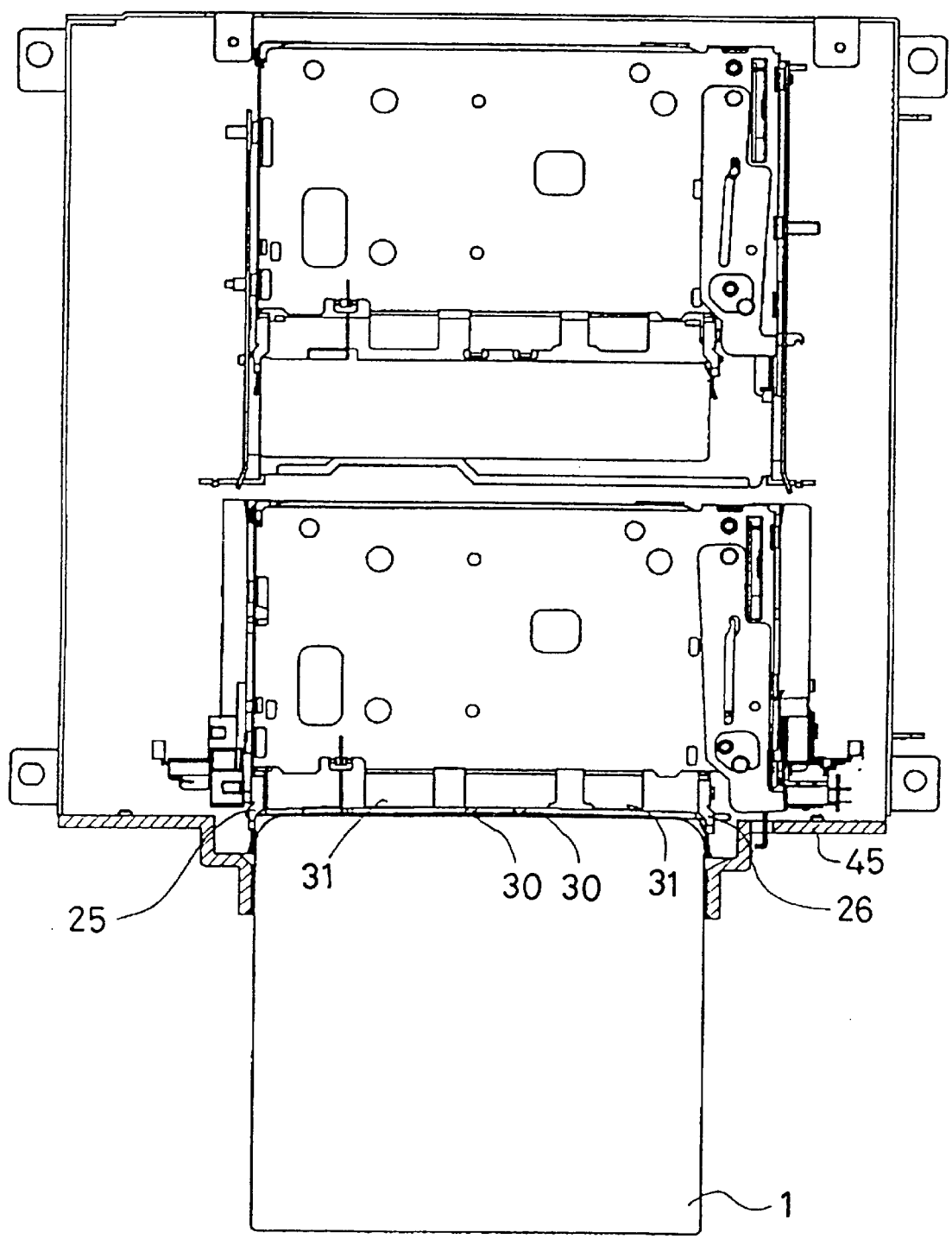
FIG. 16 is a plan view of the cartridge changing device according to the embodiment of the present invention.

On the contrary, the open/close door 28 of this embodiment shown in FIG. 16 is not bent even if the cartridge 1 is incorrectly inserted into the opening of the upstairs holder in a downward and slanting direction. That's because the receiving members 30 and projections 31 receive the front end of the cartridge 1 when the cartridge 1 comes into contact with the open/close door 28.

Figure 17:
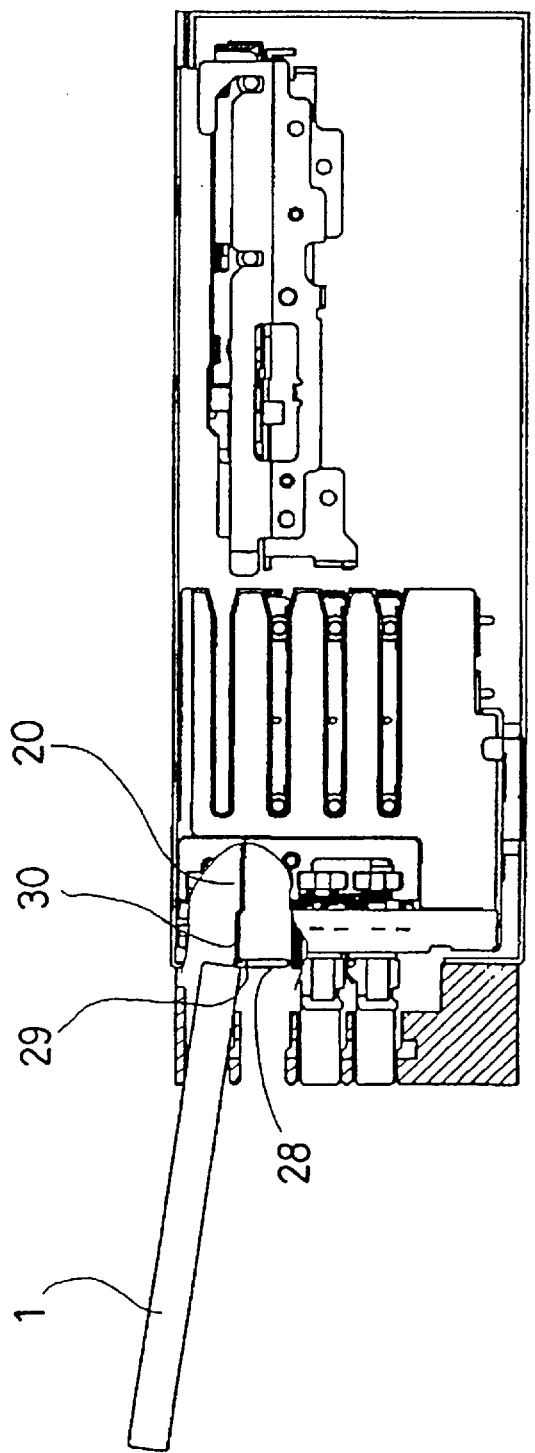
FIG. 17 is a partial side view of the cartridge changing device shown in FIG. 16.

Furthermore, the mechanism to prevent the open/close door from becoming bent will be explained with reference to FIG. 17. When a cartridge 1 is incorrectly inserted into the opening of the upstairs holder in a downward and slanting direction, it comes into contact with the open/close door 28 of the downstairs holder. However, since the receiving members 30 are inserted into the square holes 29 disposed on the axis in the vicinity of the center of the open/close door 28, the receiving members 30 serve to stop the front end of the inserted cartridge. Therefore, the open/close door is not bent. Furthermore, the function of the projections 31 for preventing the door from becoming bent will be explained hereinafter. When the cartridge 1 inserted into the holder pushes the open/close door 28 in a forward direction as far as it will go, the open/close door 28 rotates and then comes into contact with the projections 31. As a result, the upper face of the open/close door 28 is pushed back by the projections 31, and hence the axis of the open/close door 28 is not further moved in a forward direction and the ends 28a and 28b of the axis do not fall off the holes 32a and 32b for supporting the axis. Thus, the bending phenomenon and a breakage of the open/close door can be prevented. Additionally, cartridges can be smoothly inserted into a plurality of holders of the cartridge changing device of the embodiment, respectively.

In this embodiment, when a cartridge is incorrectly inserted into an opening of a holder, which lies in the upstairs of the holder to which the cartridge should be inserted, when another cartridge accommodated in the upstairs holder is being played, the cartridge comes into contact with the receiving members and projections of the holder and hence the open/close door is not bent and the ends of its axis do not fall off the holes for supporting the axis. Therefore, the possibility of damage to the cartridge changing device can be prevented.

Figure 18:
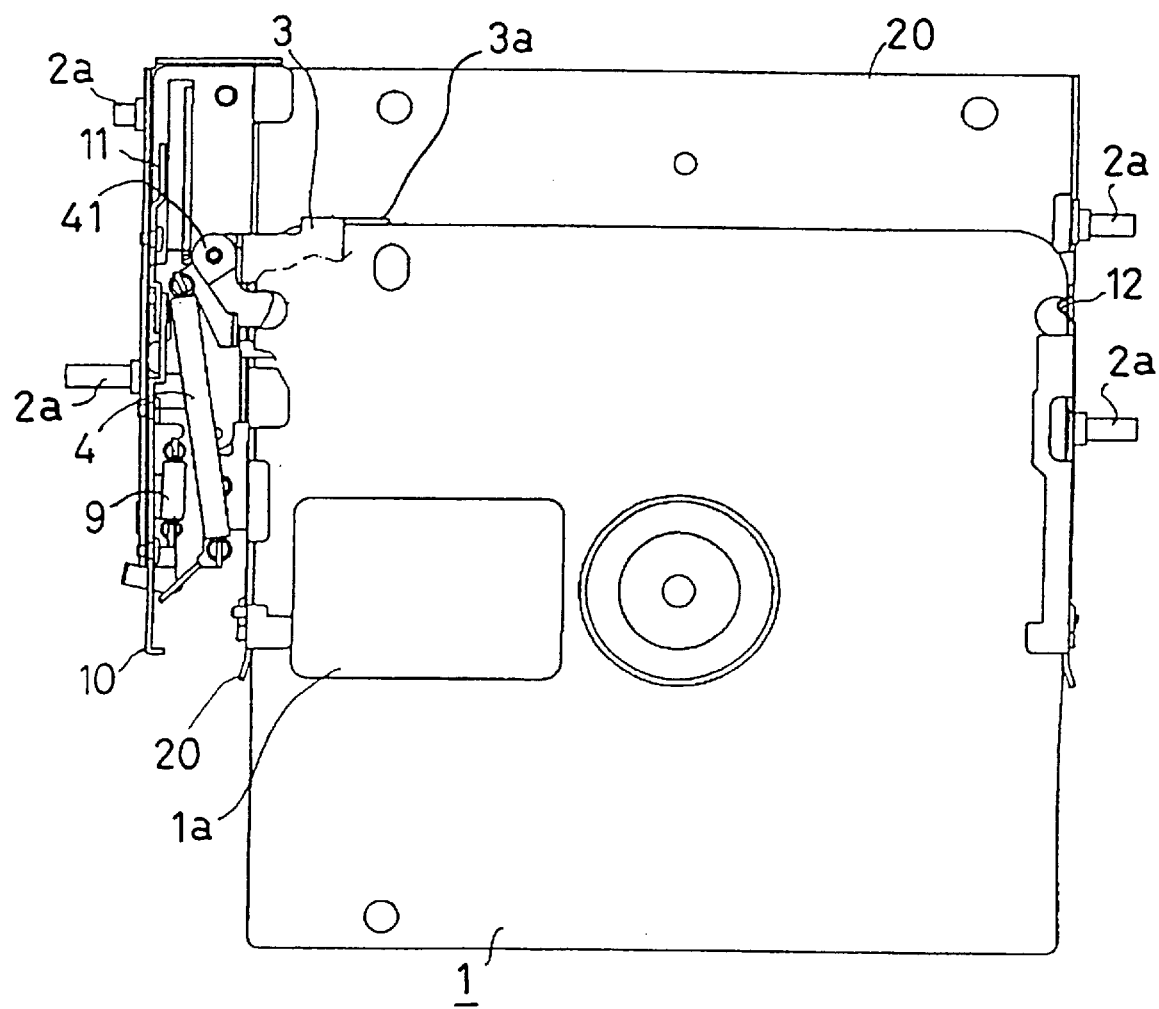
FIG. 18 is a bottom view of the holder from which a cartridge is ejected in the embodiment of the present invention.
Figure 19:
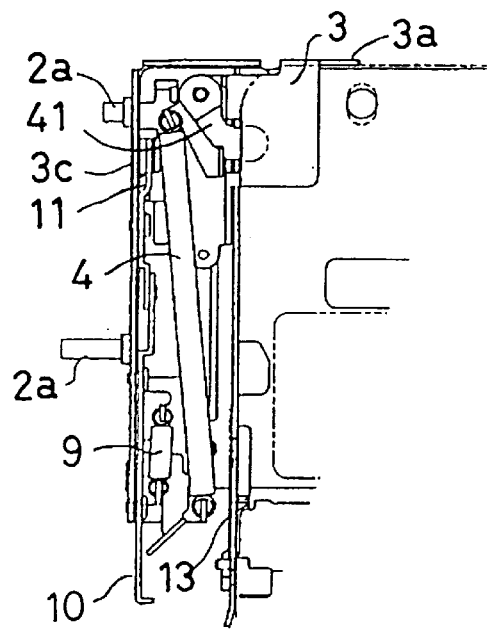
FIG. 19 is a partial bottom view of the holder in which a cartridge is locked by the locking plate in the embodiment of the present invention.
Figure 20:
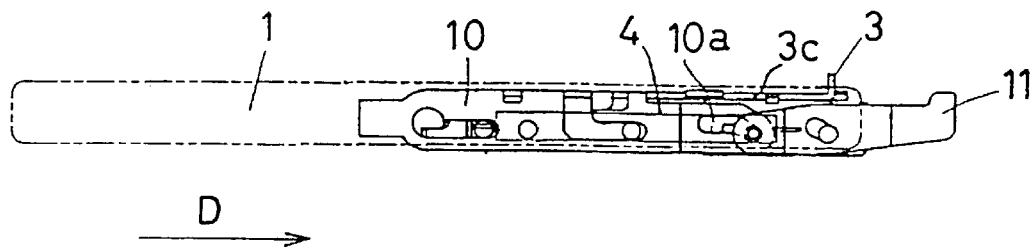
FIG. 20 is a side view of the holder from which a cartridge is ejected in to the embodiment of the present invention.
Figure 21:
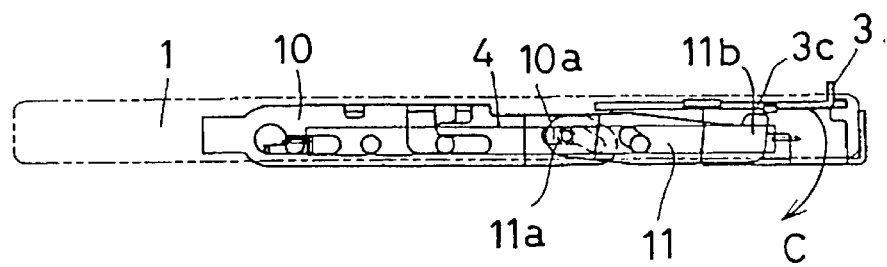
FIG. 21 is a side view of the holder in which the eject lever is pushed in the embodiment of the present invention.

Next, the description will be directed to a mechanism of carrying an inserted cartridge to the standby position and holding the cartridge during the transfer of the cartridge. FIG. 18 shows a state in which the cartridge 1 is ejected out of the holder 20. The state is accomplished by pushing the cartridge 1 frontwards against the elastic force of the spring 4. After the cartridge 1 is pushed, it comes into contact with the end 3a of the eject plate 3. The eject plate 3 shown in FIG. 19 slides frontwards as far as it will go in accordance with the forward movement of the cartridge in the direction of the arrow D, as shown in FIG. 20. During the further sliding movement of the eject plate, the locking plate 11 is rotated in the direction of the arrow C as shown in FIG. 21. When the eject plate 3 further slides and the notch 3c of the eject plate 3 reaches the projecting end 11b of the locking plate 11, the locking plate 11 is rotated in the direction opposite to the above direction of the arrow C due to the elastic force of the spring 9 transmitted through the eject lever 10 and then the end 11b of the locking plate 11 is engaged with the eject plate 3 so as to lock the eject plate 3 in the standby position of the cartridge 1.

Figure 22:
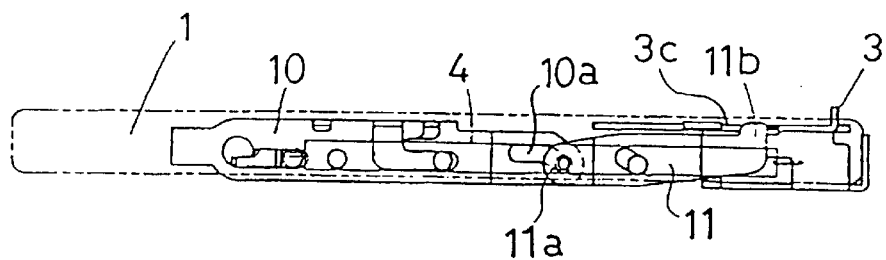
FIG. 22 is a side view of the holder in which a cartridge is locked by the locking plate in the embodiment of the present invention.

Next, the eject operation will be explained. As shown in FIG. 22, when the eject lever 10 is slid frontwards, i.e., in the direction of the arrow D shown in FIG. 20, the cam recess 10a rotates the locking plate 11 in a direction away from the eject plate 3 so as to unlock the eject plate 3. The unlocked eject plate 3 is moved back to the eject position where the cartridge is ejected from the holder due to the elastic force of the spring 4, as shown in FIG. 20. More specifically, when the eject lever 10 is pushed to the right of FIG. 22, the pin 11a disposed at one end part of the locking plate 11 slides within the inclined and horizontal parts of the cam recess 10a and simultaneously the other projecting end 11b of the locking plate 11 is rotated in the direction of the arrow C away from the eject plate 3, as shown in FIG. 21. Then, the eject plate 3 moves in the direction opposite to the direction of pushing the eject lever 10 due to the force of the spring 4 as far as it will reach the eject position, as shown in FIG. 20. As a result, the cartridge 1 is ejected from the holder.

However, the eject mechanism as shown in FIGS. 20, 21, and 22 suffers from a drawback that a smoothly discharging operation cannot be performed. That is, a cartridge is not carried to the same position every when it is ejected out of a holder and therefore it often falls off the holder when it is ejected from the holder.

Figure 23:
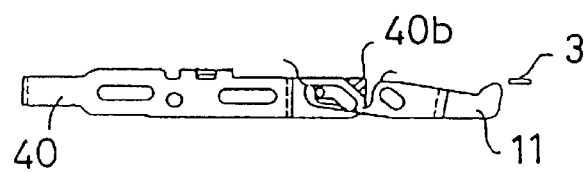
FIG. 23 is a side view of the eject lever of a holder in a cartridge changing device according to another embodiment of the present invention.
Figure 24:
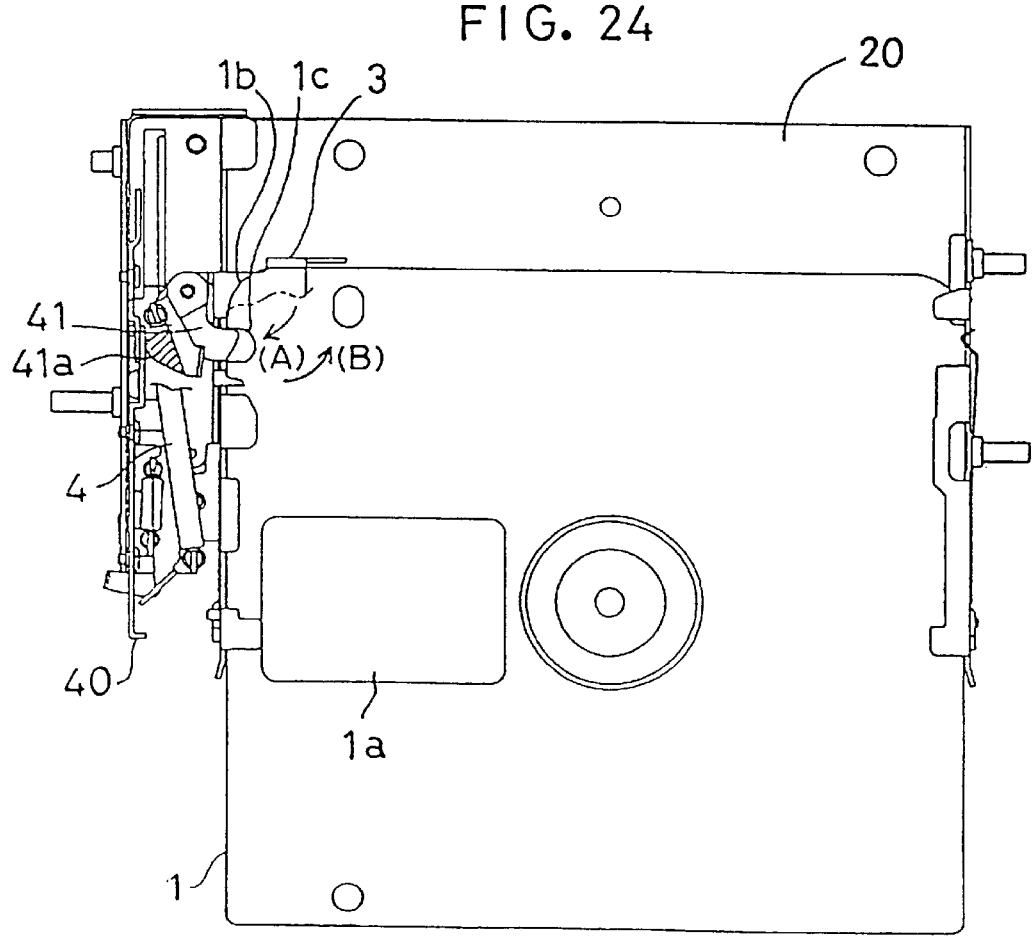
FIG. 24 is a partial bottom view of the cartridge changing device according to the other embodiment of the present invention.
Figure 25:
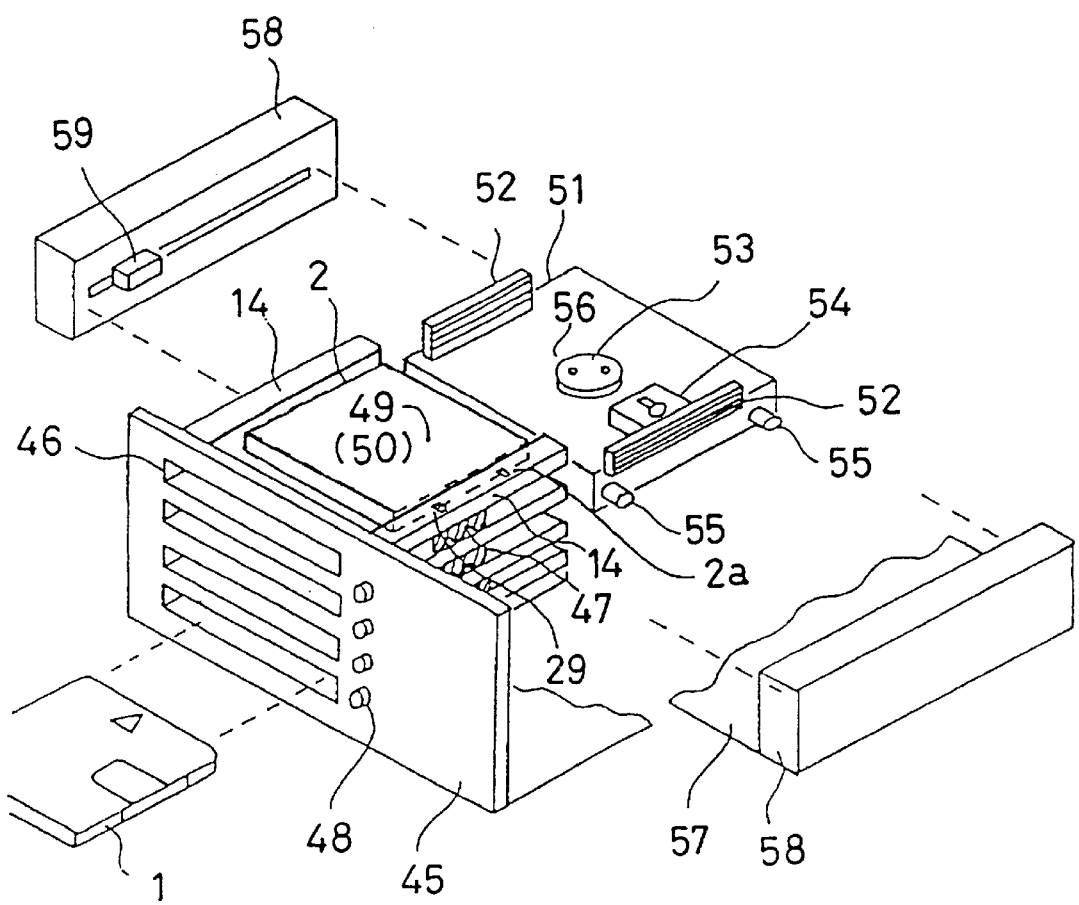
FIG. 25 is a schematic perspective view of a prior art cartridge changing device.
Figure 26:
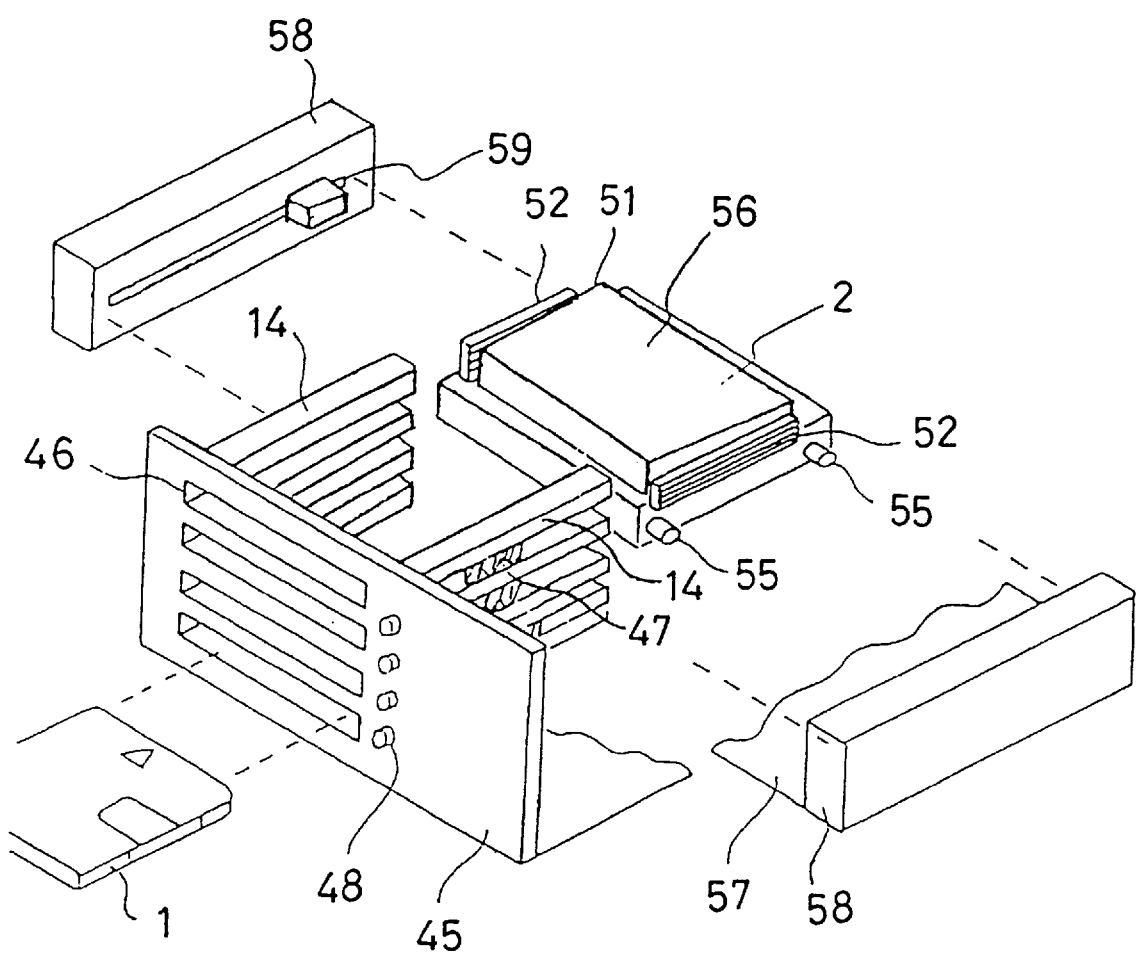
FIG. 26 is a schematic perspective view of the prior art cartridge changing device in which a cartridge is placed at the play position where it can be played.
Figure 27:
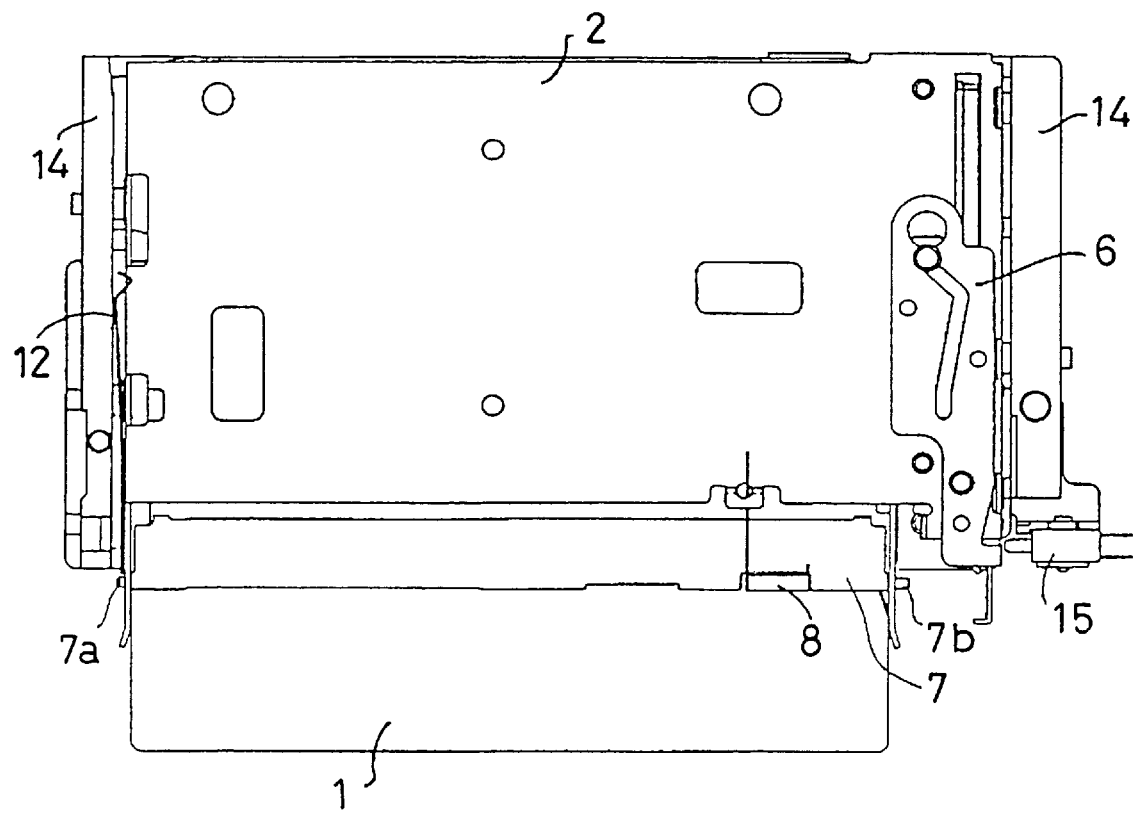
FIG. 27 is a partial plan view of the prior art cartridge changing device in which a cartridge is inserted into a holder.
Figure 28:
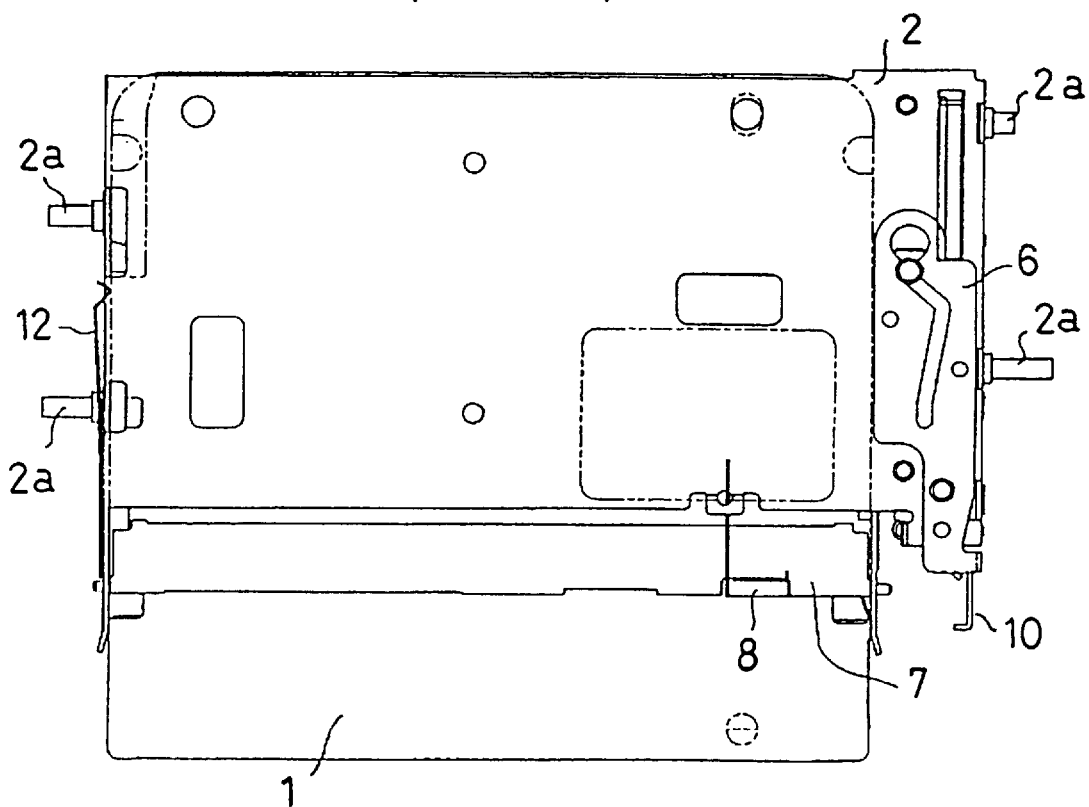
FIG. 28 is a plan view of the holder of the prior art cartridge changing device.
Figure 29:
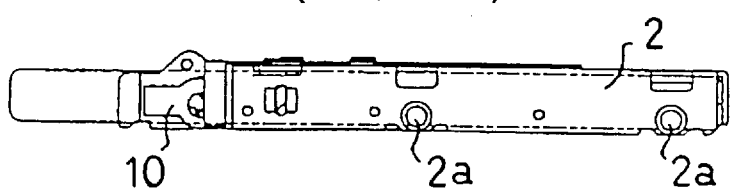
FIG. 29 is a left side view of the holder of the prior art cartridge changing device.
Figure 30:
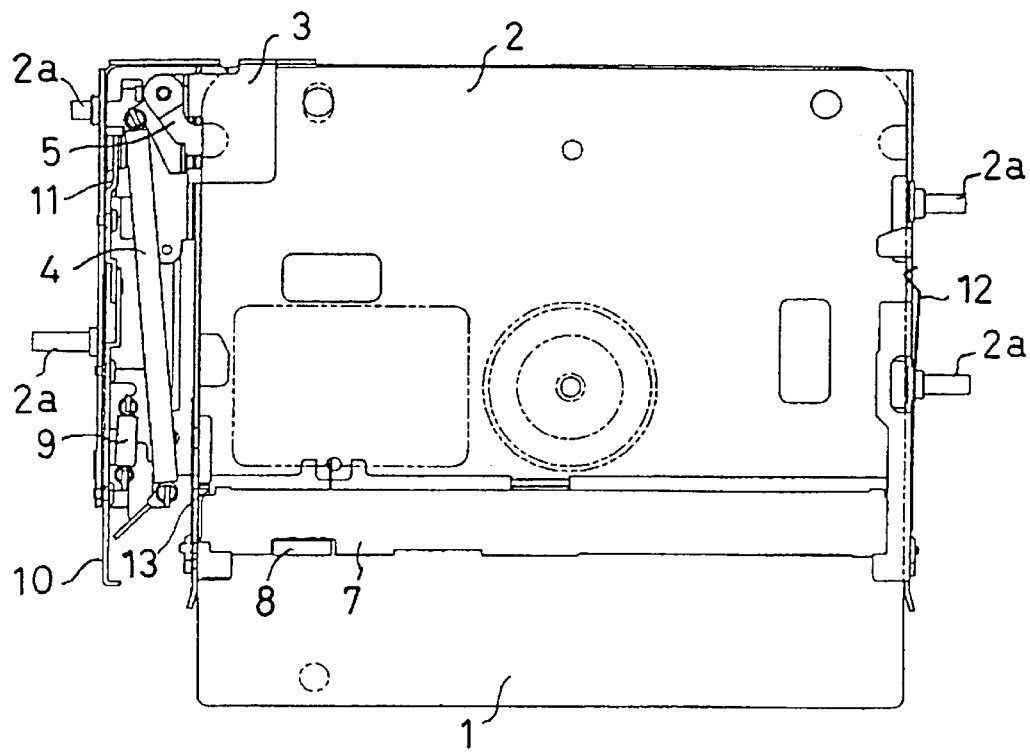
FIG. 30 is a bottom view of the prior art cartridge changing device in which a cartridge is inserted into a holder.
Figure 31:
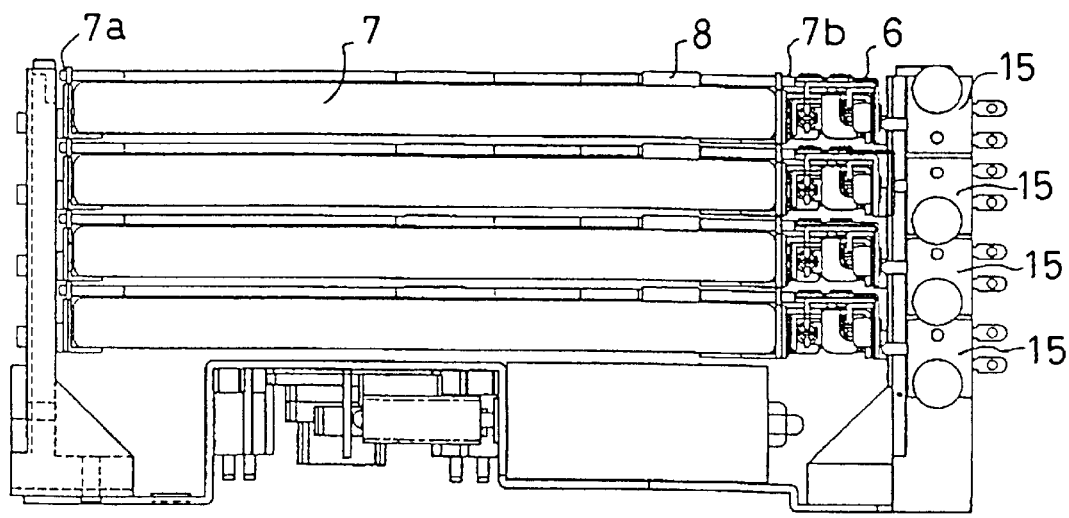
FIG. 31 is a front view of the prior art cartridge changing device.
Figure 32:
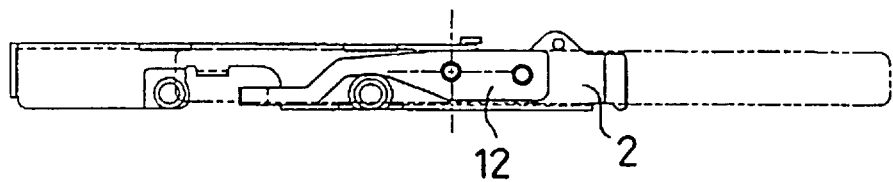
FIG. 32 is a left side view of the holder of the prior art cartridge changing device.
Figure 33:
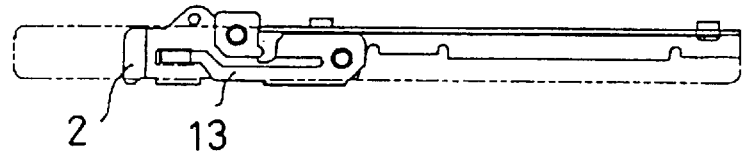
FIG. 33 is a left side view of the eject lever of the prior art cartridge changing device.

Next, the description will be directed to a cartridge changing device according to another embodiment of the present invention wherein a cartridge is moved smoothly when it is ejected out of a corresponding holder. FIG. 23 shows a side view of an eject lever 40 of this embodiment. In the figure, reference numeral 40b denotes a stopper extended from a side portion of the eject lever 40. FIG. 24 is a bottom view showing the correct stop position after ejection to which the cartridge is moved when it is ejected out of the holder under normal operating conditions. Reference numeral 41a denotes a projection disposed on the loading hook 41.

When the eject lever 40 is held pushed in order to eject the cartridge 1 from the holder, as shown in FIG. 24, the projection 41a of the loading hook 41 pivots toward the stopper 40b of the eject lever 40 shown in FIG. 23 and then abuts on it. Thus, the rotation of the loading hook 41 is restricted by the stopper. In this manner, while the eject lever 40 is held pushed, as shown in FIG. 24, the cartridge 1 is not detached from the loading hook 41, and hence it can be stopped at its correct stop position after ejection.

Next, the operation of the stopper will be described in detail. When the eject lever 40 shown in FIG. 23 is pushed as far as it will go to the position where the cartridge starts to be ejected, the locking plate 11 engaged with the eject lever 40 is rotated so as to release the eject plate 3 which has been stopped at the standby position. As a result, the eject plate 3 is pulled back into the stop position after ejection due to the elastic force of the spring 4. When the cartridge 1 reaches the stop position after ejection by virtue of the elastic force of the spring and then starts to run out of the stop position after ejection in the direction of discharging it due to the inertia of the cartridge, the loading hook 41 engaged with the cartridge 1 is rotated in the direction of releasing the cartridge, i.e., in the direction of the arrow A, against the elastic force of the spring 4. However, if the eject lever 40 is pushed to not less than the position where the cartridge starts to be ejected out of the holder, the projection 41a of the loading hook 41 comes into contact with the stopper 40b of the eject lever 40. As a result, the rotation of the loading hook 41 is blocked. The cartridge 1 does not run out of the holder 20 and hence the cartridge 1 does not fall off the holder 20 because the cartridge is held engaged with the loading hook 41 while the loading hook 41 abuts on the stopper and hence its rotation is restricted. As shown in FIG. 24, the loading hook 41 is rotated back in the direction of holding the cartridge (the arrow B) again due to the elastic force of the spring 4. As a result, the cartridge 1 is stopped at the correct stop position after ejection.

As mentioned above, since the cartridge changing device according to this embodiment comprises the stopper 40b disposed on the eject lever 40 and the projection 41a disposed on the loading hook 41, it makes it possible to restrict the rotation of the loading hook 41 and therefore prevent the cartridge 1 from running out of and falling off the holder 20.

As previously mentioned, the present invention offers the following advantageous effects.

According to the first embodiment of the present invention, if a cartridge is detached from one holder due to a careless operation by an user during a movement of the holder, the cartridge changing device detects the detachment of the cartridge and then putts the holder back into position. Thus, the device makes it possible to quickly detect wrong operations before a mishandled cartridge reaches its play position, thereby preventing damage to the device and cartridge.

The cartridge changing device further comprises a first flat spring for holding a cartridge in each of the holders and a second flat spring for closing the shutter of the cartridge when the cartridge is ejected from the holder. The walls of the holes for supporting the axis of the open/close door of the holder are partially constructed by parts of the first and second flat springs. Therefore, the thickness of the plural holders can be reduced and the thickness of the device can be reduced.

Furthermore, when a cartridge is inserted into an opening of a holder, which is located in the upstairs of the holder free of a cartridge, when another cartridge has already been played, the receiving members of the holder, which are inserted into the holes of the open/close door, receive (or stop) the front end of the inserted cartridge. Thus, the receiving members prevent the open/close door from being bent when a cartridge is inserted into the holder in a downward and slanting direction. That is, the axis of the door does not fall off the holes for supporting the axis even if the inserted cartridge comes into contact with the door.

In a preferred embodiment of the present invention, since the cartridge changing device comprises the mechanism for restricting the rotation of the loading hook engaged with an inserted cartridge when discharging the cartridge from a holder, the cartridge does not run out of the holder and hence the cartridge does not fall off the holder.

Many widely different embodiments of the present invention may be constructed without departing from the spirit and scope of the present invention. It should be understood that the present invention is not limited to the specific embodiments described in the specification, except as defined in the appended claims.

What is claimed is:

1. A cartridge changing device comprising:

a holder which is movable from a standby position where a cartridge is inserted thereunto to a play position where the cartridge is to be played;

a loading hook rotatably disposed and engageable with the cartridge inserted into said holder to hold the cartridge; and cartridge transfer means for stopping the cartridge at a stop position after ejection where the cartridge is ejected out of said holder by restricting a reverse rotation of said loading hook in a direction of releasing the cartridge during an eject lever of said holder is pushed after the cartridge in said holder located at the standby position has been transferred to the stop position after ejection by pushing the eject lever.

2. The cartridge changing device according to claim 1, wherein the eject lever includes a stopper and said loading hook includes a projection which comes into contact with the stopper of the eject lever after the eject lever has been pushed so as to restrict the rotation of the loading hook and hence stop the cartridge at the stop position after ejection.

3. The cartridge changing device according to claim 1, further comprising an eject plate that receives the cartridge and transfers the cartridge to the stop position after ejection.

4. The cartridge changing device according to claim 3, further comprising a locking plate engaged with the eject lever and rotatable to release the eject plate after ejection.

5. A method for changing a cartridge in a device having a holder which is movable from a standby position where a cartridge is inserted thereunto to a play position, comprising:

(a) rotatably disposing and engaging a loading hook with the cartridge inserted into the holder to hold the cartridge; and (b) stopping the cartridge at a stop position after an ejection where the cartridge is ejected out of the holder by restricting a reverse rotation of the loading hook in a direction of releasing the cartridge while an eject lever of the holder is pushed upon ejection to transfer the cartridge in the holder located at the standby position to the stop position.

6. The method according to claim 5, further comprising engaging a projection of the loading hook with a stopper of the eject lever after the eject lever has been pushed to restrict the rotation of the loading hook and hence stop the cartridge at the stop position after ejection.

7. The method according to claim 5, further comprising receiving the cartridge into an eject plate that transfers the cartridge to the stop position after ejection.

8. The method according to claim 7, further comprising:

engaging a locking plate with the eject lever and the eject plate; and rotating the locking plate with the eject lever to release the eject plate after ejection.

* * * * *